United States Patent
Nagasawa et al.

(10) Patent No.: US 9,727,809 B2
(45) Date of Patent: Aug. 8, 2017

(54) MOBILE TERMINAL, PROGRAM, AND COMMUNICATION SYSTEM FOR AVOIDING DISPLAY OF AN UNNECESSARY MESSAGE

(71) Applicant: KONICA MINOLTA, INC., Chiyoda-ku, Tokyo (JP)

(72) Inventors: Kenichi Nagasawa, Takatsuki (JP); Toshiya Furubayashi, Takarazuka (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/073,496

(22) Filed: Mar. 17, 2016

(65) Prior Publication Data

US 2016/0292553 A1    Oct. 6, 2016

(30) Foreign Application Priority Data

Apr. 6, 2015    (JP) ................................ 2015-077944

(51) Int. Cl.
*G06F 15/00* (2006.01)
*G06F 1/00* (2006.01)
(Continued)

(52) U.S. Cl.
CPC ....... *G06K 15/4095* (2013.01); *G06F 3/1222* (2013.01); *G06F 3/1236* (2013.01); *G06F 3/1292* (2013.01); *H04N 1/00127* (2013.01)

(58) Field of Classification Search
CPC . G06K 15/4095; G06F 3/1222; G06F 3/1236; G06F 3/1292
(Continued)

(56) References Cited

U.S. PATENT DOCUMENTS 7,761,908 B2    7/2010  Yokoyama
8,879,089 B2   11/2014  Sakura
(Continued)

FOREIGN PATENT DOCUMENTS

JP    2006035849 A    2/2006
JP    2012138970 A    7/2012
(Continued)

OTHER PUBLICATIONS

Japanese Office Action (and English translation thereof) dated May 9, 2017, issued in counterpart Japanese Application No. 2015-077944.

*Primary Examiner* — Douglas Tran
(74) *Attorney, Agent, or Firm* — Holtz, Holtz & Volek PC

(57) ABSTRACT

A mobile terminal operated in cooperation with an information processing device capable of setting an authentication mode relating to user authentication to one mode selected from two kinds of modes of an authentication request mode requiring the user authentication, and a non-authentication request mode not requiring the user authentication, the mobile terminal including: a display unit configured to display a confirmation message inquiring a user of the mobile terminal whether to perform authentication operation; and a control unit configured to control display operation for displaying the confirmation message, acquiring, from the information processing device, authentication mode information being information representing whether the authentication mode is the authentication request mode or the non-authentication request mode, and displaying the confirmation message on the display unit, on condition that the authentication mode information is acquired, the authentication mode information representing that the authentication mode is the authentication request mode.

17 Claims, 17 Drawing Sheets

(51) Int. Cl.
*G06K 15/00* (2006.01)
*G06F 3/12* (2006.01)
*H04N 1/00* (2006.01)

(58) Field of Classification Search
USPC ............................. 358/1.1, 1.13, 1.14, 1.15
See application file for complete search history.

(56) References Cited

U.S. PATENT DOCUMENTS

| | | |
|---|---|---|
| 2010/0188695 A1 | 7/2010 | Okigami |
| 2013/0321864 A1 | 12/2013 | Jintsugawa et al. |
| 2015/0046975 A1* | 2/2015 | Kato ........................ H04L 63/08 |
| | | 726/3 |
| 2015/0169027 A1* | 6/2015 | Akiba .................... G06F 1/3209 |
| | | 713/320 |
| 2015/0205550 A1* | 7/2015 | Lee ........................ G06F 3/1204 |
| | | 358/1.15 |
| 2015/0365783 A1* | 12/2015 | Akimoto .................... G06F 3/12 |
| | | 455/41.1 |
| 2016/0085979 A1* | 3/2016 | Fukasawa .......... H04N 1/00151 |
| | | 726/17 |

FOREIGN PATENT DOCUMENTS

| | | | |
|---|---|---|---|
| JP | 2013167969 A | 8/2013 | |
| JP | 2013247606 A | 12/2013 | |
| JP | 2015033084 A | 2/2015 | |

* cited by examiner

| MAC ADDRESS | IP ADDRESS | AUTHENTICATION INFORMATION | |
| --- | --- | --- | --- |
| | | USER ID | PASSWORD |
| 11:22:33:44:55:66 | 192.168.30.1 | SUZUKI1 | ****** |
| 11:22:33:44:55:77 | 192.168.30.2 | SUZUKI2 | **** |

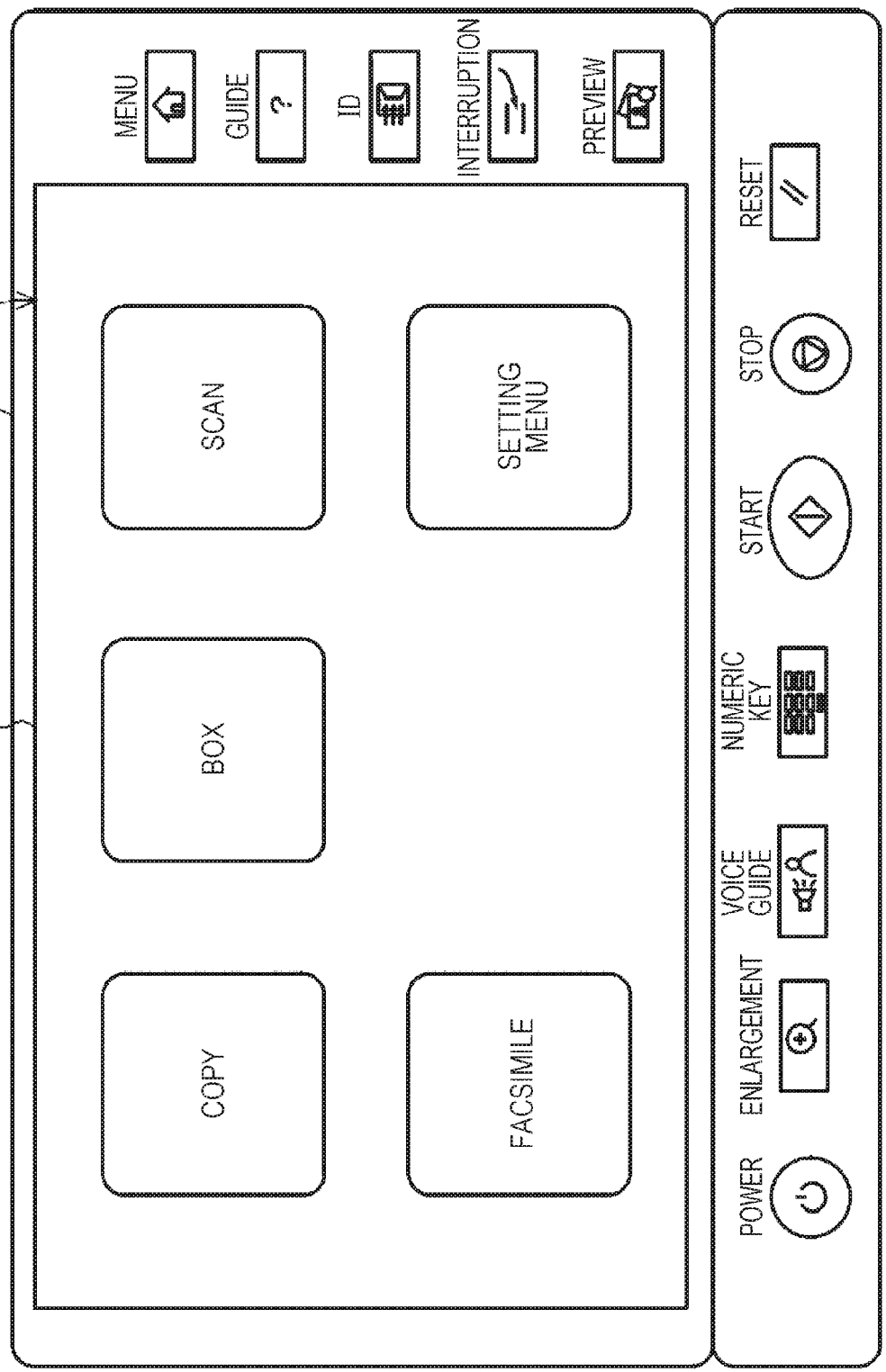

MOBILE TERMINAL, PROGRAM, AND COMMUNICATION SYSTEM FOR AVOIDING DISPLAY OF AN UNNECESSARY MESSAGE

The entire disclosure of Japanese Patent Application No. 2015-077944 filed on Apr. 6, 2015 including description, claims, drawings, and abstract are incorporated herein by reference in its entirety.

BACKGROUND OF THE INVENTION

Field of the Invention

The present invention relates to a mobile terminal operated in cooperation with an information processing device (image forming device), and a technology relating to the mobile terminal.

Description of the Related Art

There has been a technology for cooperation between image forming devices such as multi-functional peripherals (MFP) and external mobile terminals for the image forming devices (see JP 2012-138970 A and the like).

Various wireless communication technologies are used for communication between the image forming devices and the mobile terminals. For example, communication over a wireless LAN (IEEE 802.11 etc.) and/or near field communication can be used therefor. As the near field communication, there are communication based on Bluetooth (registered trademark) standard, communication based on Bluetooth Low Energy (BLE) being an evolution of Bluetooth standard, and the like.

Such wireless communication is used for communication between the image forming device and the mobile terminal, and various applied technologies are created.

For example, it can be considered that BLE or the like is used to emit radio waves circumferentially from the image forming device, the mobile terminal approaching the periphery of the image forming device receives the radio waves using BLE, and the mobile terminal detects approach to the image forming device.

In addition, in response to the detection of the approach to the image forming device, the mobile terminal can automatically start authentication operation (e.g., authentication information transmission operation).

However, when the BLE or the like is used, a radio wave having a strength increased to a certain level is required to be circumferentially transmitted from the image forming device, because a radio wave from the image forming device has variation in strength. As a result, even if only a user carrying the mobile terminal passes in front of the image forming device, the strength of the radio wave from the image forming device may be determined to exceed the certain level (in short, excessive response of the mobile terminal). Thus, when the mobile terminal is configured to automatically start the authentication operation in response to the detection of approach to the image forming device, the authentication operation may be performed contrary to user's intention.

To solve this problem, the inventor has further proposed a technology for displaying, in a display unit of the mobile terminal carried by the user approaching to the image forming device, a confirmation message for confirmation of performance of the authentication, upon approach of the mobile terminal carried by the user to the image forming device. According to this configuration, the user's authentication operation is not automatically started, but the authentication operation is started based on an instruction from the user confirming the confirmation message, and thus, user's intention can be accurately confirmed to advance the authentication operation.

However, in such a technology, when the confirmation message is displayed without restriction according to the approach of the mobile terminal to the image forming device, a message unnecessary for the user may be also displayed.

For example, some image forming devices can set necessity of the user authentication. In such an image forming device, when unnecessity of the user authentication is set (any user can freely use the image forming device without being required to input the authentication information), authentication operation performance confirmation is unnecessary for the user. In other words, when the message for confirming performance of the authentication operation is displayed in the mobile terminal, despite setting free use without the input of the authentication information in the image forming device, the user must confirm the unnecessary message.

SUMMARY OF THE INVENTION

An object of the present invention is to provide a technology for reducing opportunities of displaying an unnecessary message, in a mobile terminal operated in cooperation with an information processing device (image forming device).

To achieve the abovementioned object, according to an aspect, a mobile terminal operated in cooperation with an information processing device capable of setting an authentication mode relating to user authentication to one mode selected from two kinds of modes of an authentication request mode requiring the user authentication, and a non-authentication request mode not requiring the user authentication, the mobile terminal reflecting one aspect of the present invention comprises: a display unit configured to display a confirmation message inquiring a user of the mobile terminal whether to perform authentication operation, upon detection of approach of the mobile terminal to the information processing device; and a control unit configured to control display operation for displaying the confirmation message, the control unit acquiring, from the information processing device, authentication mode information being information representing whether the authentication mode of the information processing device is the authentication request mode or the non-authentication request mode, the control unit displaying the confirmation message on the display unit, on condition that the authentication mode information is acquired, the authentication mode information representing that the authentication mode is the authentication request mode.

According to an invention of Item. 2, in the mobile terminal of Item. 1, on condition that a strength of a radio wave for near field communication from the information processing device is larger than a predetermined threshold, the control unit preferably determines that the approach of the mobile terminal to the information processing device is detected.

According to an invention of Item. 3, in the mobile terminal of Item. 1 or 2, while an application software program for performing the authentication operation runs in the foreground in the mobile terminal, when acquiring the authentication mode information representing that the authentication mode is the authentication request mode, the control unit preferably displays the confirmation message in a screen of the application software program, and when acquiring the authentication mode information representing that the authentication mode is the non-authentication request mode, the control unit does not preferably display the confirmation message in the display unit.

According to an invention of Item. 4, in the mobile terminal of Item. 1 or 2, while an application software program for performing the authentication operation runs in the background in the mobile terminal, when acquiring the authentication mode information representing that the authentication mode is the authentication request mode, the control unit preferably displays the confirmation message in the display unit, using a notify function of an operating system of the mobile terminal, and when acquiring the authentication mode information representing that the authentication mode is the non-authentication request mode, the control unit does not preferably display the confirmation message in the display unit.

According to an invention of Item. 5, in the mobile terminal of any one of Items. 1 to 4, the control unit preferably transmits a transmission request for the authentication mode information to the information processing device, in response to detection of approach of the mobile terminal to the information processing device, and the control unit preferably acquires the authentication mode information transmitted from the information processing device, in response to the transmission request.

According to an invention of Item. 6, in the mobile terminal of any one of Items. 1 to 4, the control unit preferably acquires the authentication mode information, based on transmission data broadcast-transmitted from the information processing device in near field communication, upon detection of approach of the mobile terminal to the information processing device.

According to an invention of Item. 7, in the mobile terminal of any one of Items. 1 to 6, the control unit preferably acquires the authentication mode information from the information processing device via near field communication.

According to an invention of Item. 8, in the mobile terminal of any one of Items. 1 to 6, the control unit preferably acquires the authentication mode information from the information processing device via wireless LAN communication.

To achieve the abovementioned object, according to an aspect, a non-transitory recording medium storing a computer readable program reflecting one aspect of the present invention causes a computer built in a mobile terminal operated in cooperation with an information processing device capable of setting an authentication mode relating to user authentication to one mode selected from two kinds of modes of an authentication request mode requiring the user authentication, and a non-authentication request mode not requiring the user authentication, to execute: a step a) of acquiring, from the information processing device, authentication mode information being information representing whether the authentication mode of the information processing device is the authentication request mode or the non-authentication request mode; and a step b) of displaying, in a display unit of the mobile terminal, a confirmation message inquiring a user of the mobile terminal whether to perform authentication operation, upon detection of approach of the mobile terminal to the information processing device, the confirmation message being displayed, on condition that the authentication mode information representing that the authentication mode is the authentication request mode is acquired, in the step b).

According to an invention of Item. 10, in the non-transitory recording medium storing a computer readable program of Item. 9, in the step b), on condition that a strength of a radio wave for near field communication from the information processing device is larger than a predetermined threshold, detection of approach of the mobile terminal to the information processing device is preferably determined.

According to an invention of Item. 11, in the non-transitory recording medium storing a computer readable program of Item. 9 or 10, the program is preferably an application software program performing the authentication operation, and in the step b), while the application software program runs in the foreground in the mobile terminal, when the authentication mode information representing that the authentication mode is the authentication request mode is acquired, the confirmation message is preferably displayed in a screen of the application software program, and when the authentication mode information representing that the authentication mode is the non-authentication request mode is acquired, the confirmation message is not preferably displayed in the display unit.

According to an invention of Item. 12, in the non-transitory recording medium storing a computer readable program of Item. 9 or 10, the program is preferably an application software program performing the authentication operation, and in the step b), while the application software program runs in the background in the mobile terminal, when the authentication mode information representing that the authentication mode is the authentication request mode is acquired, the confirmation message is preferably displayed in the display unit, using a notify function of an operating system of the mobile terminal, and when the authentication mode information representing that the authentication mode is the non-authentication request mode is acquired, the confirmation message is not preferably displayed in the display unit.

According to an invention of Item. 13, in the non-transitory recording medium storing a computer readable program of any one of Items. 9 to 12, the program preferably further causes the computer to execute a step c) of transmitting a transmission request for the authentication mode information to the information processing device, in response to detection of approach of the mobile terminal to the information processing device, before the step a), the authentication mode information transmitted from the information processing device being acquired, in response to the transmission request, in the step a).

According to an invention of Item. 14, in the non-transitory recording medium storing a computer readable program of any one of Items. 9 to 12, in the step a), the authentication mode information is preferably acquired, based on transmission data broadcast-transmitted from the information processing device in near field communication, upon detection of approach of the mobile terminal to the information processing device.

According to an invention of Item. 15, in the non-transitory recording medium storing a computer readable program of any one of Items. 9 to 14, in the step a), the authentication mode information is preferably acquired from the information processing device via near field communication.

According to an invention of Item. 16, in the non-transitory recording medium storing a computer readable program of any one of Items. 9 to 14, in the step a), the authentication mode information is preferably acquired from the information processing device via wireless LAN communication.

To achieve the abovementioned object, according to an aspect, a communication system reflecting one aspect of the present invention comprises: an information processing device configured to set an authentication mode relating to user authentication to one mode selected from two kinds of modes of an authentication request mode requiring the user authentication, and a non-authentication request mode not requiring the user authentication; and a mobile terminal operated in cooperation with the information processing device, the mobile terminal having: a display unit configured to display a confirmation message inquiring a user of the mobile terminal whether to perform authentication operation, upon detection of approach of the mobile terminal to the information processing device; and a control unit configured to control display operation for displaying the confirmation message, the information processing device having a communication unit configured to transmit, to the mobile terminal, authentication mode information being information representing whether the authentication mode of the information processing device is the authentication request mode or the non-authentication request mode, the control unit of the mobile terminal acquiring the authentication mode information from the information processing device, and displaying the confirmation message in the display unit of the mobile terminal, on condition that the authentication mode information representing that the authentication mode is the authentication request mode is acquired.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 11 is a diagram illustrating a registration data table;

FIG. 17 is a diagram illustrating a display screen (top menu screen).

DESCRIPTION OF THE PREFERRED EMBODIMENTS

Hereinafter, an embodiment of the present invention will be described with reference to the drawings. However, the scope of the invention is not limited to the illustrated examples.

<1. Outline of Configuration>

Figure 1:
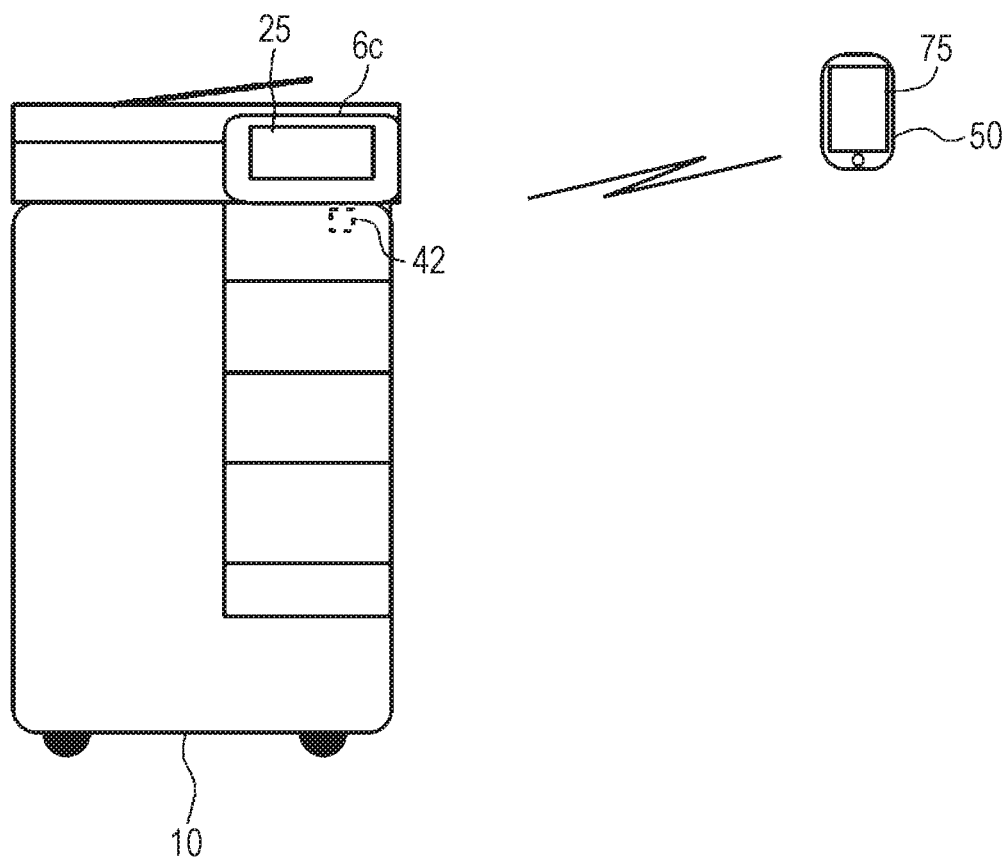
FIG. 1 is a diagram illustrating a communication system.

FIG. 1 is a diagram illustrating a communication system 1 according to an embodiment of the present invention. As illustrated in FIG. 1, the communication system 1 includes an image forming device (MFP) 10 as an information processing device, and a mobile terminal 50.

The MFP 10 and the mobile terminal 50 are wirelessly connected to each other using various wireless communication technologies. For example, for communication between the MFP 10 and the mobile terminal 50, communication over a wireless LAN (IEEE 802.11 etc.) and near field communication can be used. In the present embodiment, communication based on Bluetooth Low Energy (BLE) is used as the near field communication, and an approach determination process or the like is performed between the mobile terminal 50 and the MFP 10.

The MFP 10 can set an authentication mode relating to user authentication to one mode selected from two kinds of modes, that is, an "authentication request mode" and a "non-authentication request mode".

Figure 10:
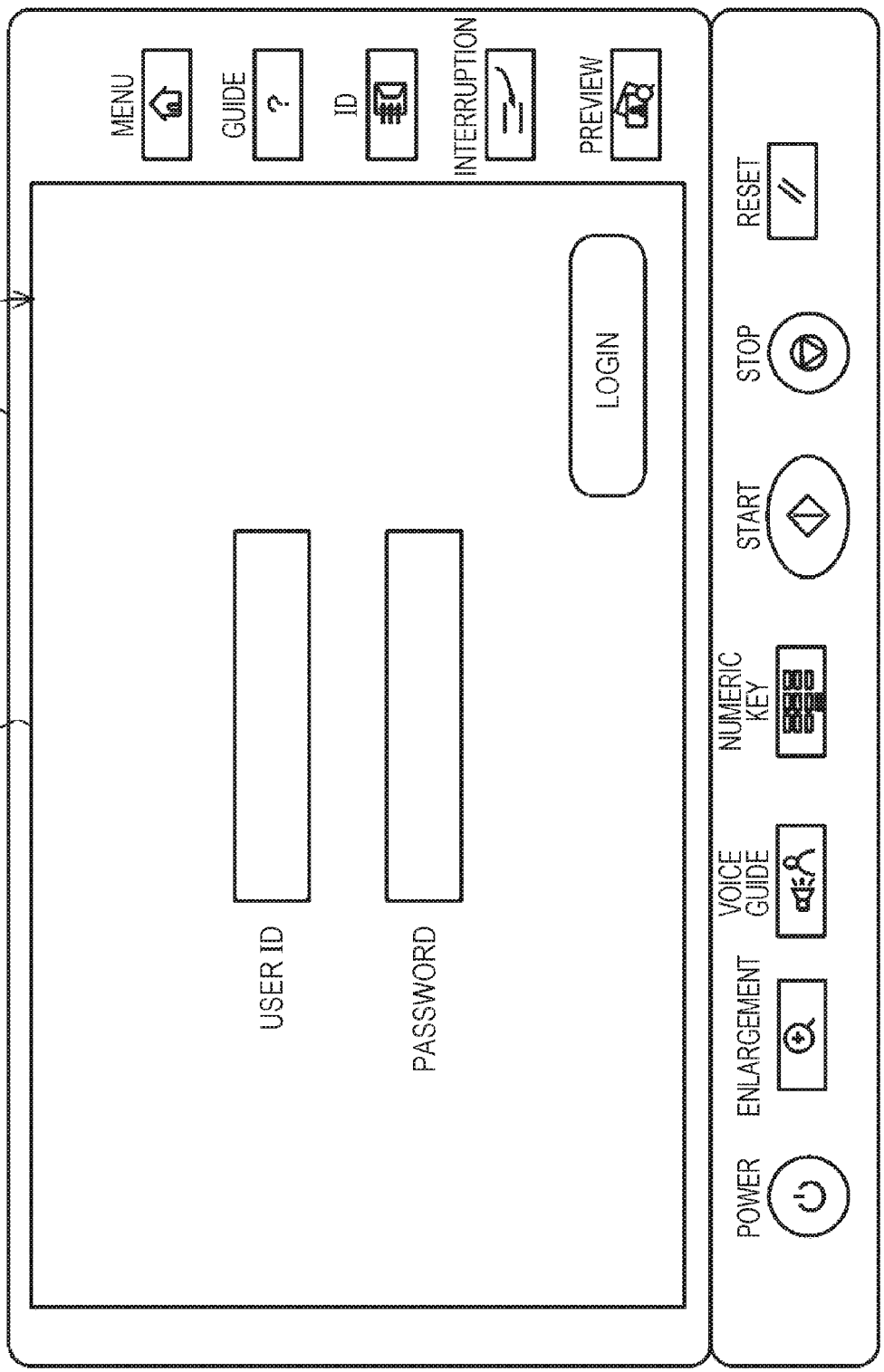
FIG. 10 is a diagram illustrating a display screen (login reception screen)

The "authentication request mode" is the authentication mode requiring the user authentication for using the MFP 10. When the authentication mode of the MFP 10 is set to the "authentication request mode", the MFP 10 waits for a user login wile displaying, on a touch panel 25, a login reception screen 201 as illustrated in FIG. 10. When a user uses the MFP 10, the MFP 10 requires the user to input authentication information (login information). When the user inputs the authentication information, the MFP 10 compares the input authentication information and regular authentication information, and performs an authentication process (login process). When authentication is successfully achieved, a top menu screen 202 (see FIG. 17) or the like is displayed in the touch panel 25, and the user can use the MFP 10.

In contrast, the "non-authentication request mode" is the authentication mode not requiring the user authentication for using the MFP 10. When the authentication mode of the MFP 10 is set to the "non-authentication request mode", the MFP 10 does not require the user using the MFP 10 to input the authentication information. In other words, the login reception screen 201 is not displayed on the touch panel 25 of the MFP 10 to use the MFP 10, and any user can (freely) use the MFP 10 freely without being required to input the authentication information.

<2. Configuration of Image Forming Device>

Figure 2:
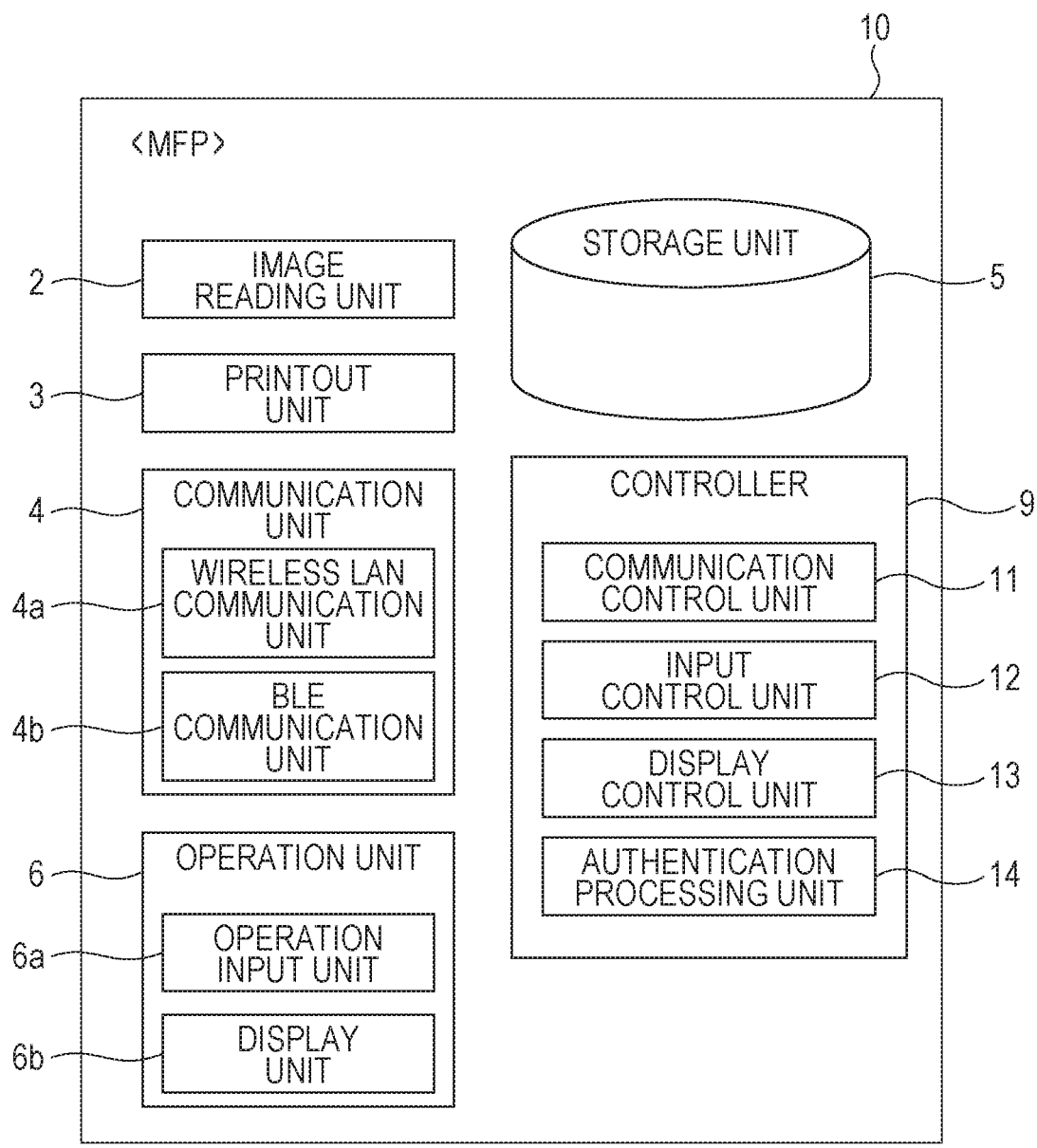
FIG. 2 is a diagram illustrating a functional block of an image forming device (MFP)

FIG. 2 is a diagram illustrating a functional block of the image forming device 10. Here, as the image forming device 10, the multi-functional peripheral (MFP) will be exemplified. In FIG. 2, a functional block of the MFP 10 is illustrated.

The MFP 10 is a device (also referred to as multi-functional peripheral) including a scan function, a copy function, a facsimile function, a box storage function, and the like. Specifically, as illustrated in the functional block diagram of FIG. 2, the MFP 10 includes an image reading unit 2, a printout unit 3, a communication unit 4, a storage unit 5, an operation unit 6, a controller (control unit) 9, and the like, and the units are multiply operated to achieve various functions.

The image reading unit 2 is a processing unit for optically reading (i.e., scans) a document mounted on a predetermined position of the MFP 10, and generating image data of the document (also referred to as a document image or a scanned image). This image reading unit 2 is also referred to as a scanning unit.

The printout unit 3 is an output unit for printing out an image to various mediums such as paper sheets, based on data about an object to be printed.

The communication unit 4 is a processing unit capable of performing facsimile communication through a public network or the like. Furthermore, the communication unit 4 can also perform various wireless communication (including wireless communication over the BLE, or the like). Specifically, the communication unit 4 includes a wireless LAN communication unit 4a for performing wireless communication over the wireless LAN (IEEE 802.11 etc.), and a BLE communication unit 4b for performing wireless communication over the BLE. The MFP 10 has a built-in BLE chip 42 (also referred to as a near field communication chip (or also simply referred to as a communication chip)) functioning as part of whole of the BLE communication unit 4b (see also FIG. 1). Advertising data (transmission data to be broadcast-transmitted) can be broadcast-transmitted (transmitted to multiple addresses) by the BLE chip 42. The advertising data includes a media access control address (MAC address) or the like of the MFP 10.

The storage unit 5 includes a storage device such as a hard disk drive (HDD).

The operation unit 6 includes an operation input unit 6a configured to receive operation input to the MFP 10, and a display unit 6b configured to perform display/output of various information.

The MFP 10 is provided with an operation panel unit 6c (see FIG. 1) having substantially a plate shape. In addition, the operation panel unit 6c has the touch panel 25 (see FIG. 1), on the front side. The touch panel 25 also functions as part of the operation input unit 6a and part of the display unit 6b. The touch panel 25 is configured by embedding various sensors or the like in a liquid crystal display panel, displays various information thereon, and receives various operation input from an operator.

The controller (control unit) 9 is a control device built in the MFP 10 and configured to generally control the MFP 10. The controller 9 is configured as a computer system including a CPU, various semiconductor memories (RAM and ROM), and the like. In the CPU, the controller 9 executes predetermined software programs (hereinafter, also simply referred to as programs) stored in the ROM (e.g., EEPROM) to achieve various processing units. Note that, the programs (specifically, a program module group) may be recorded in a portable recording medium, such as a USB memory, to be installed in the MFP 10 through the recording medium, or may be installed in the MFP 10 through the wireless LAN or the like.

Specifically, as illustrated in FIG. 2, the controller 9 executes the programs to achieve various processing units including a communication control unit 11, an input control unit 12, a display control unit 13, and an authentication processing unit 14.

The communication control unit 11 is a processing unit for controlling communication operation with another device (mobile terminal 50 etc.), in cooperation with the communication unit 4 or the like. The communication control unit 11 has a transmission control unit for controlling various data transmission operations, and a reception control unit for controlling various data reception operations.

The input control unit 12 is a control unit configured to control operation input to the operation input unit 6a (touch panel 25 etc.). For example, the input control unit 12 controls reception of operation input (user's specification input etc.) to an operation screen displayed in the touch panel 25.

The display control unit 13 is a processing unit for controlling display operation in the display unit 6b (touch panel 25 etc.). The display control unit 13 displays, in the touch panel 25, the operation screen 200 or the like for operating the MFP 10.

The authentication processing unit 14 is a processing unit for controlling performance or the like of the authentication process (process of comparing between user authentication information received from the mobile terminal 50 and regular user authentication information) based on the user authentication information from the mobile terminal 50.

<3. Configuration of Mobile Terminal>

The mobile terminal 50 is a device configured to be operable in cooperation with the image forming device (MFP) 10.

A configuration of the mobile terminal 50 will be described.

The mobile terminal 50 is an information input/output terminal device (information terminal) allowing network communication with the MFP 10. Here, a smartphone will be described as an example of the mobile terminal 50. However, the mobile terminal 50 is not limited to the smartphone, and may be a tablet terminal or the like.

Figure 3:
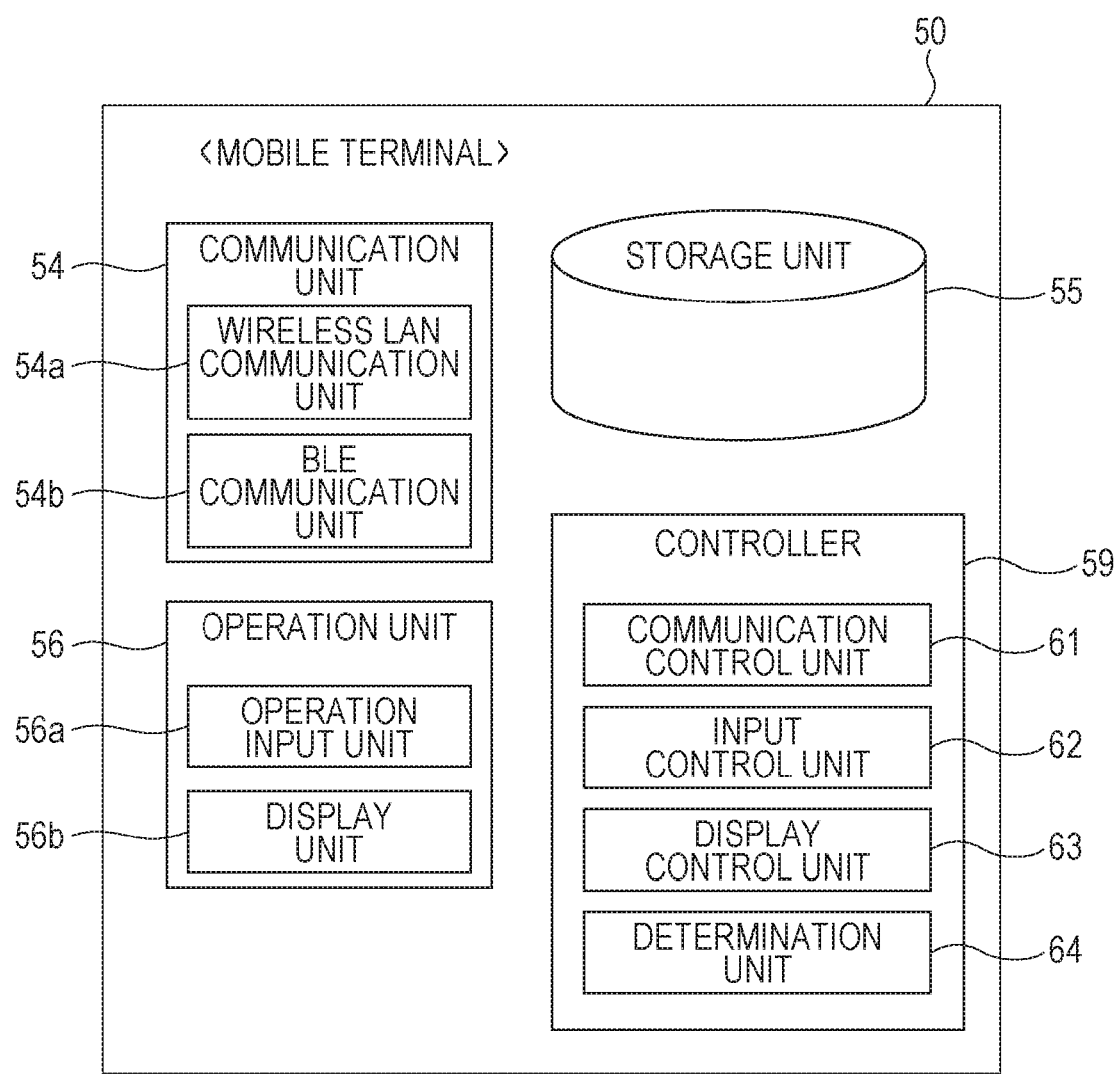
FIG. 3 is a functional block diagram illustrating a schematic configuration of a mobile terminal.

FIG. 3 is a functional block diagram illustrating a schematic configuration of the mobile terminal 50.

As illustrated in a functional block diagram of FIG. 3, the mobile terminal 50 includes a communication unit 54, a storage unit 55, an operation unit 56, a controller (control unit) 59, and the like, and the units are multiply operated to achieve various functions.

The communication unit 54 can perform various wireless communication (including wireless communication over the BLE or the like). Specifically, the communication unit 54 includes a wireless LAN communication unit 54a for performing wireless communication over the wireless LAN (IEEE 802.11 etc.), and a BLE communication unit 54b for performing wireless communication over the BLE. The BLE communication unit 54b receives the advertising data broadcast-transmitted from the BLE chip 42 built in the MFP 10, and measures a strength of a radio wave for data transmission.

The storage unit 55 includes a storage device such as a non-volatile semiconductor memory. The storage unit 55 stores various screens 500 described later (see FIG. 12 etc.) (specifically, data to be displayed for various screens 500) or the like.

The operation unit 56 includes an operation input unit 56a configured to receive operation input to the mobile terminal 50, and a display unit 56b configured to perform display/output of various information. The mobile terminal 50 is provided with a touch panel 75 (see FIG. 1) configured by embedding various sensors or the like in the liquid crystal display panel. The touch panel 75 also functions as part of the operation input unit 56a and part of the display unit 56b.

The controller (control unit) 59 of FIG. 3 is a control device built in the mobile terminal 50 and configured to generally control the mobile terminal 50. The controller 59 is configured as a computer system including a CPU, various semiconductor memories (RAM and ROM), and the like. In the CPU, the controller 59 executes predetermined software programs (hereinafter, also simply referred to as programs) stored in a storage unit (e.g., semiconductor memory) to achieve various processing units. Note that, the programs (specifically, the program module group) may be recorded in the portable recording medium, such as the USB memory, to be installed in the mobile terminal 50 through the recording medium, or may be installed in the mobile terminal 50 through the wireless LAN or the like.

A program (authentication program) or the like for performance of authentication operation (e.g., display operation for displaying confirmation message) is installed in the mobile terminal 50. The authentication program is an application software program (also simply referred to as application) configured to achieve various processes including a process of detecting approach to the MFP 10, a process of transmitting the authentication information to the MFP 10, or the like.

Specifically, the controller 59 executes the authentication program and the like to achieve various processing units including a communication control unit 61, an input control unit 62, a display control unit 63, and a determination unit 64.

The communication control unit 61 is a processing unit for controlling communication operation with the MFP 10, in cooperation with the communication unit 54 or the like. For example, the communication control unit 61 cooperates with the communication unit 54 or the like to control operations of transmitting, to the MFP 10, a transmission request for authentication mode information of the MFP 10, and receiving (acquiring) the authentication mode information sent back in response to the transmission request. In addition, the communication control unit 61 controls operation of transmitting the user authentication information to the MFP 10, in response to confirmation operation such as the confirmation message 500 or the like (described later).

The input control unit 62 is a control unit configured to control operation input to the operation input unit 56a (touch panel 75 etc.).

The display control unit 63 is a processing unit for controlling display operation in the display unit 56b (touch panel 75 etc.). The display control unit 63 controls, for example, display operation for displaying a message screen 500 or the like in the display unit 56b.

The determination unit 64 is a processing unit configured to perform operation of determining approach of the mobile terminal 50 itself to the MFP 10 within a certain range based on a criterion (process of detecting approach to the MFP 10). In addition, the determination unit 64 performs for example a process of determining whether the authentication mode of the MFP 10 is the authentication request mode or the non-authentication request mode, based on the authentication mode information (mentioned below) from the MFP 10.

The controller 59 uses the various processing units or the like to control the authentication operation.

<4. Operation>
<4-1. Outline of Operation>

When the approach of the mobile terminal 50 to the MFP 10 is detected as described later, the confirmation message for confirming performance of the authentication operation is displayed in the touch panel 75. However, the confirmation message is displayed in the touch panel 75, on condition that the authentication mode of the MFP 10 is set to the "authentication request mode". When the authentication mode of the MFP 10 is set to the "non-authentication request mode", the confirmation message is not displayed in the touch panel 75.

In addition, the confirmation message is displayed in different manners, between an authentication application having a foreground running state and the authentication application having a background running state.

Specifically, when the authentication application has the foreground running state, the confirmation message 500 (for foreground running state) (see FIGS. 12 and 13) is displayed in a screen 600 of the authentication application, under direct control of the authentication application. However, the confirmation message 500 is displayed in the touch panel 75, only when the authentication mode of the MFP 10 is set to the "authentication request mode". When the authentication mode of the MFP 10 is set to the "non-authentication request mode", the confirmation message 500 is not displayed in the touch panel 75.

In addition, when the authentication application has the background running state, a confirmation message 700 (for background running state) (see FIGS. 15 and 16) is displayed in the touch panel 75 using a notify function of an operating system (OS) of the mobile terminal 50. However, the confirmation message 700 is displayed in the touch panel 75, only when the authentication mode of the MFP 10 is set to the "authentication request mode". When the authentication mode of the MFP 10 is set to the "non-authentication request mode", the confirmation message 700 is not displayed in the touch panel 75.

As described above, when the authentication mode of the MFP 10 is set to the "authentication request mode", one confirmation message of the two kinds of confirmation messages 500 and 700 is displayed according to the authentication mode. In contrast, when the authentication mode of the MFP 10 is set to the "non-authentication request mode", any of two kinds of confirmation messages 500 and 700 is not displayed in the touch panel 75.

A process of determining whether to display the confirmation message, or the like will be described below in detail.

<4-2. Process of Detecting Approach to MFP, Process of Determining Authentication Mode, and Like>

The MFP 10 always emits a radio wave for BLE communication at micro time intervals. Specifically, the advertising data is broadcast-transmitted at micro time intervals by the BLE chip 42 (see FIG. 1) built in the MFP 10. The radio wave for BLE communication reaches only a peripheral area of the MFP 10 (e.g., within several ten centimeters to several meters).

In contrast, the mobile terminal 50 receives the radio wave for BLE communication from the MFP 10, and also measures the strength of the radio wave from the MFP 10. Specifically, the BLE communication unit 54b of the mobile terminal 50 receives the advertising data broadcast-transmitted from the BLE chip 42, and measures the strength of the radio wave for data transmission. In addition, the authentication program installed in the mobile terminal 50 acquires the strength of the radio wave (in the foreground running state or the background running state) Note that, the measurement of the strength of the radio wave may be partially performed also by the authentication program.

Figure 4:
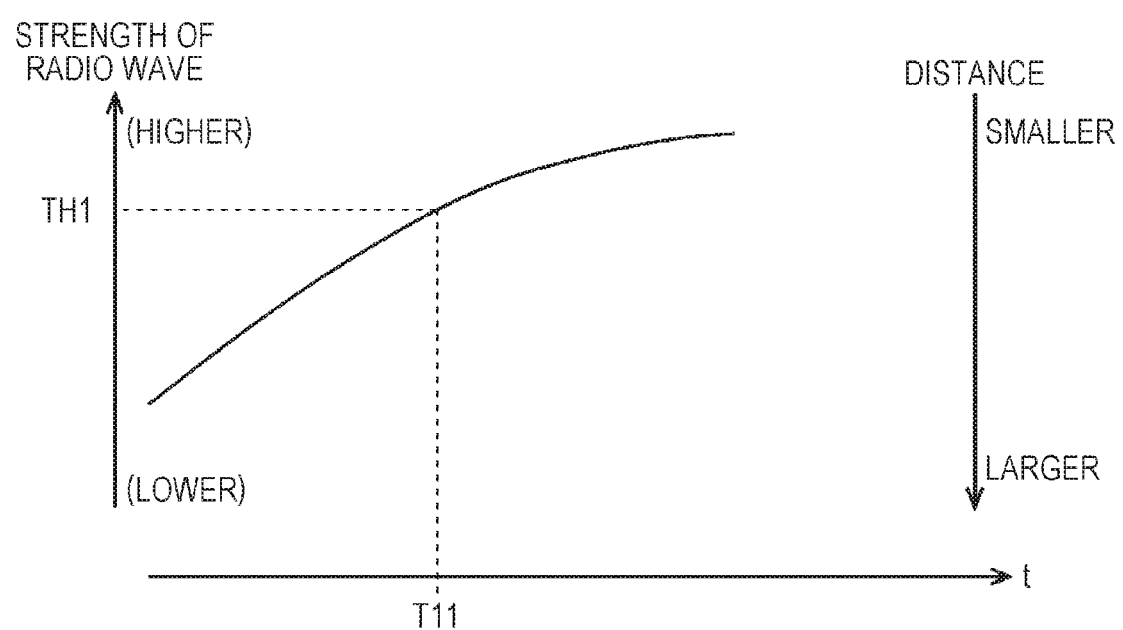
FIG. 4 is a graph illustrating time variation or the like of a strength of a radio wave.

Upon access of the mobile terminal 50, as the mobile terminal 50 accesses the MFP 10 (i.e., as the distance between the mobile terminal 50 and the MFP 10 is reduced), the strength of the radio wave (strength of a BLE radio wave transmitted from the BLE chip 42 in the MFP 10) detected by the mobile terminal 50 is increased (see FIG. 4). In contrast, as the mobile terminal 50 separates from the MFP 10 (i.e., as the distance between the mobile terminal 50 and the MFP 10 is increased), the strength of the radio wave (strength of the BLE radio wave from the MFP 10) detected by the mobile terminal 50 is reduced.

Figure 5:
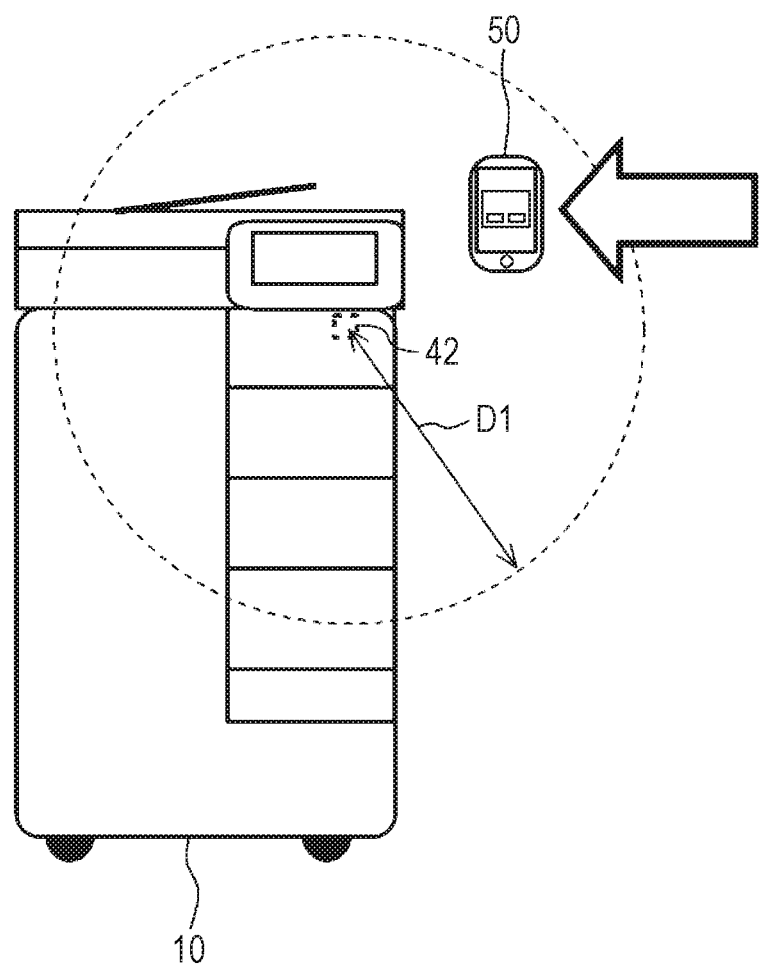
FIG. 5 is a diagram illustrating the mobile terminal accessing the MFP.

Such a property is used, and when the strength of the radio wave detected by the mobile terminal 50 is changed (increased) to a value exceeding a predetermined threshold TH1, the mobile terminal 50 determines that approach of the mobile terminal 50 to the MFP 10 is detected (see FIG. 4). Specifically, the distance between the mobile terminal 50 and the MFP 10 (more specifically, arrangement position of the BLE chip 42 in the MFP 10) is determined to be at a distance (distance not more than a predetermined value D1) within a predetermined range (e.g., 20 cm) (see FIG. 5). Note that, preferably, a value of the strength of the radio wave is preliminarily measured when the mobile terminal 50 approaches the MFP 10 to have a distance D1 (e.g., approximately 20 cm), and the measured value is defined as the threshold TH1.

Specifically, first, as the user approaches the MFP 10, the strength of the radio wave detected by the mobile terminal 50 is gradually increased. For example, it is assumed that the user accesses the MFP 10 while holding the mobile terminal 50 in hand, and moves the mobile terminal 50 held in hand while facing the touch panel 25 of the MFP 10. During such movement, the strength of the radio wave detected by the mobile terminal 50 is increased from a value less than the threshold TH1 to a value larger than the threshold TH1 (time T11) (see FIG. 4). In response to detection of the increased strength of the radio wave, the mobile terminal 50 determines that the mobile terminal 50 approaches a position within the predetermined range relative to the MFP 10.

Figure 6:
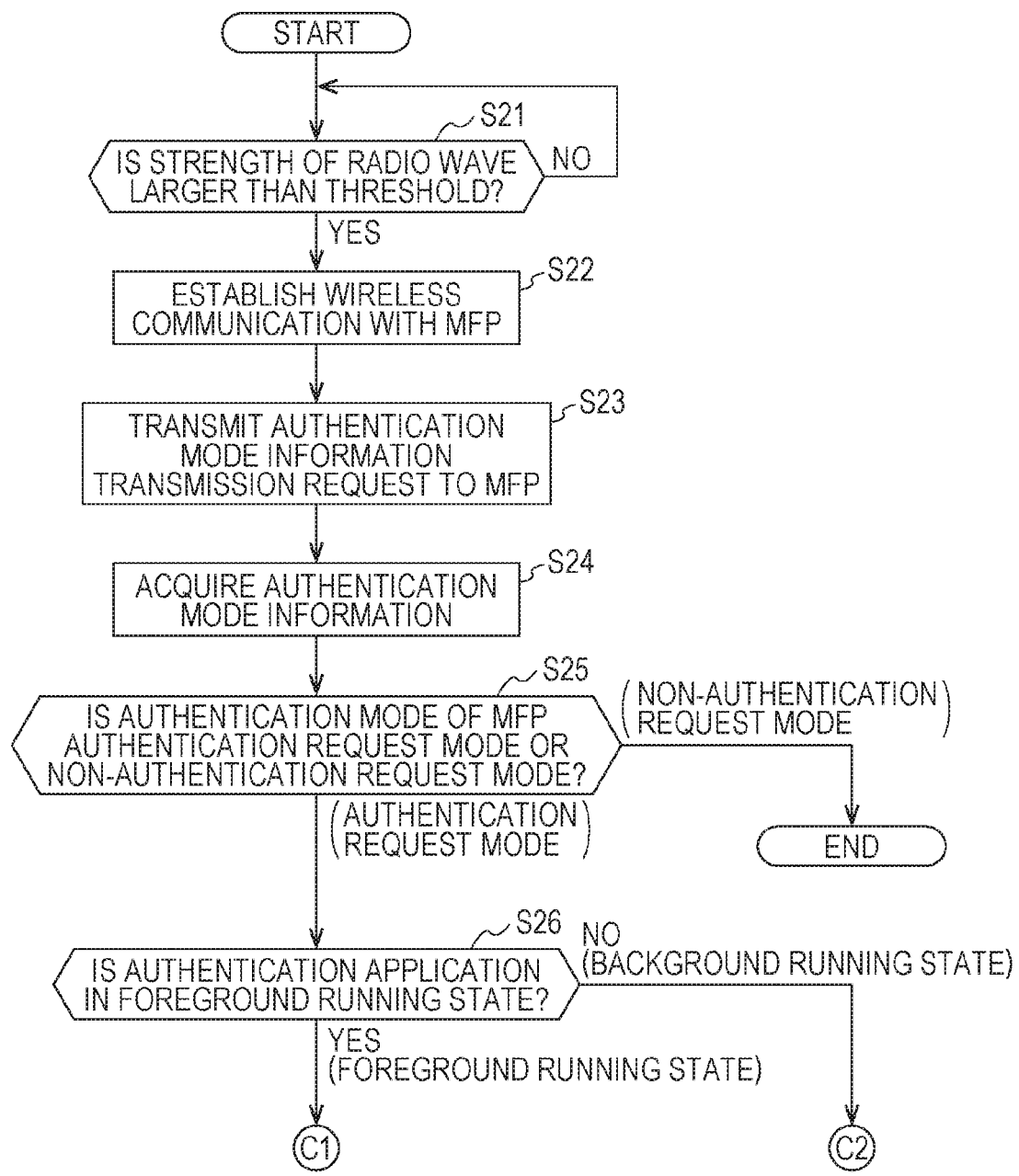
FIG. 6 is a flowchart illustrating operation of the mobile terminal.
Figure 7:
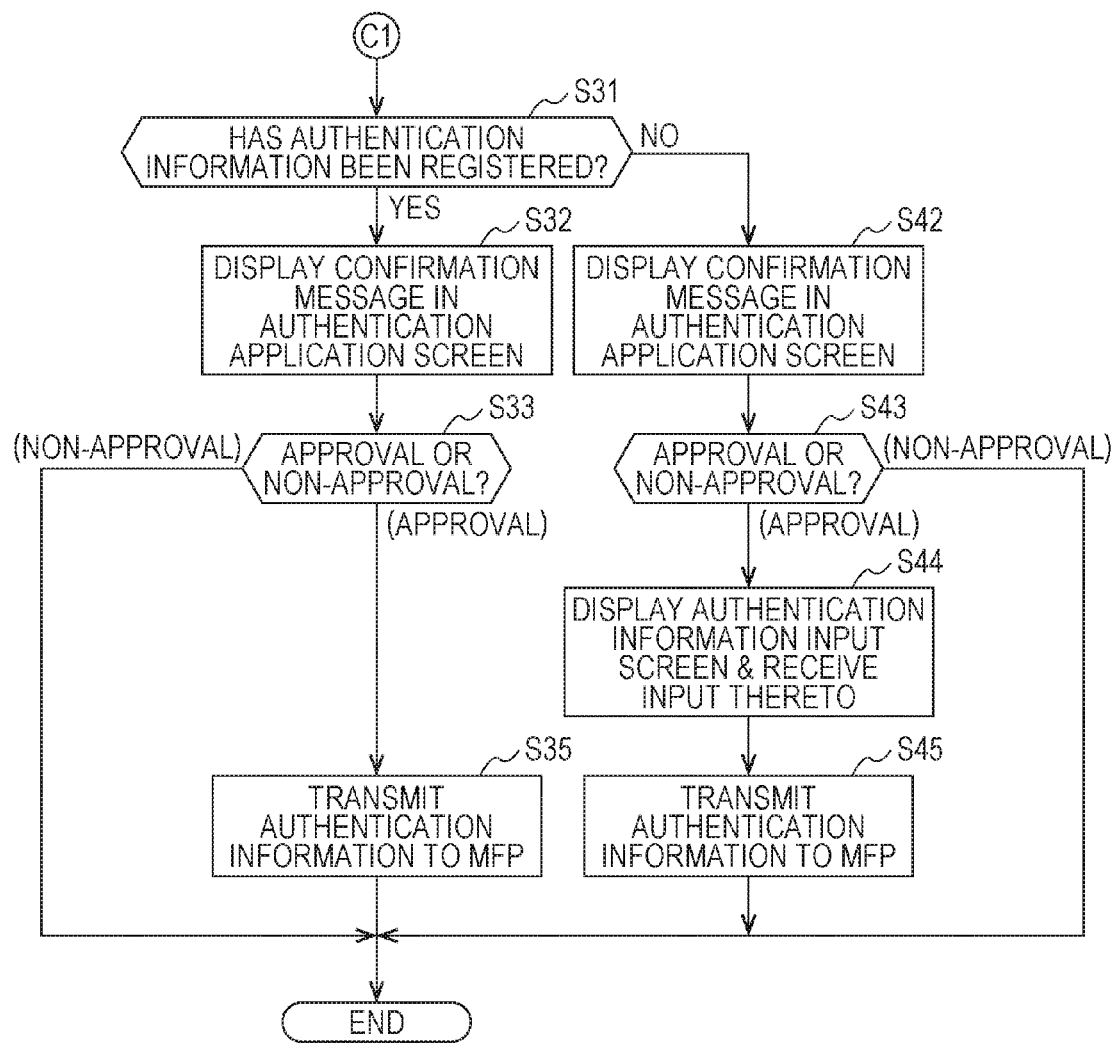
FIG. 7 is a flowchart illustrating operation of the mobile terminal, where an authentication program has a foreground running state.
Figure 8:
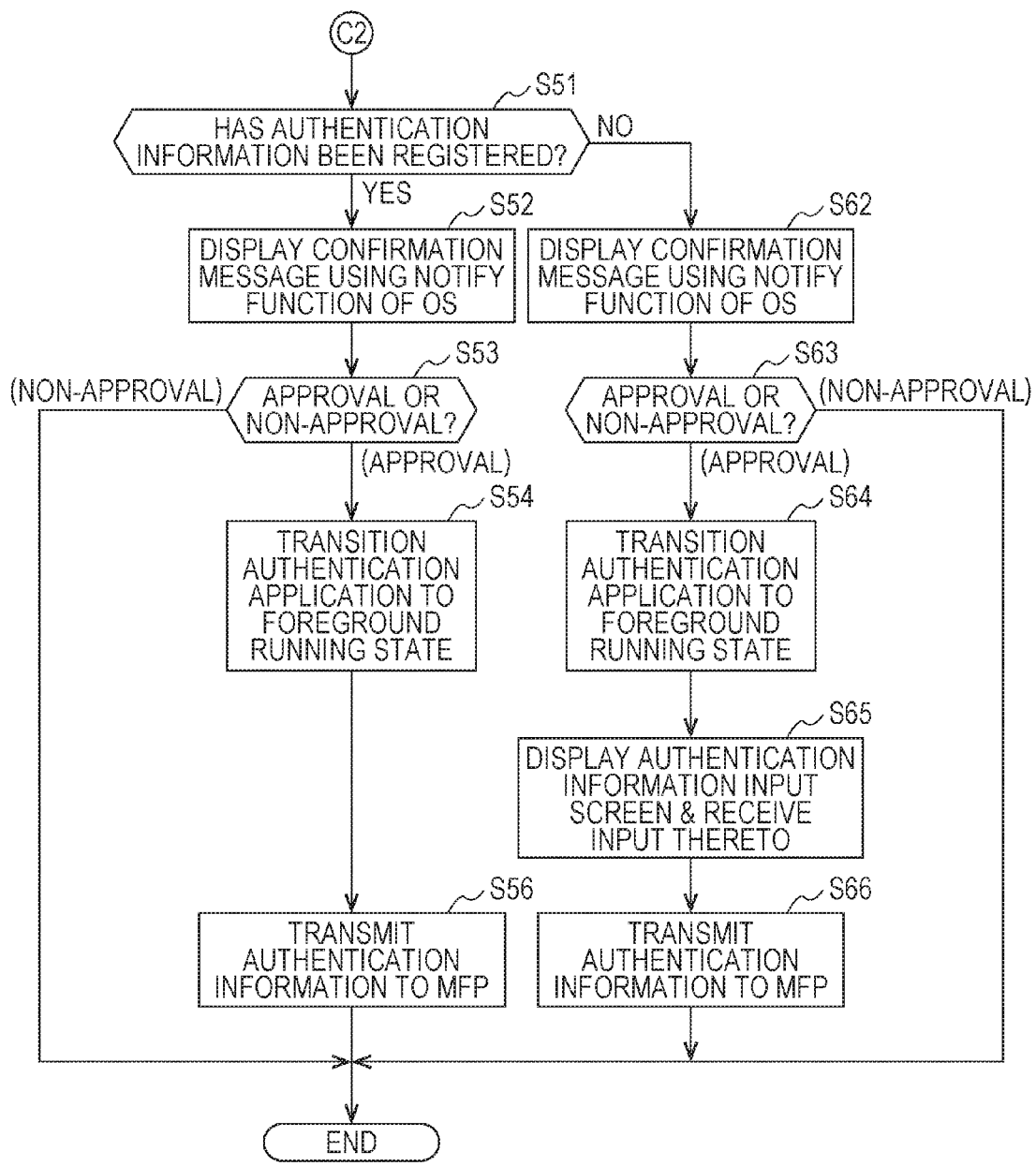
FIG. 8 is a flowchart illustrating operation of the mobile terminal, where the authentication program has a background running state.
Figure 9:
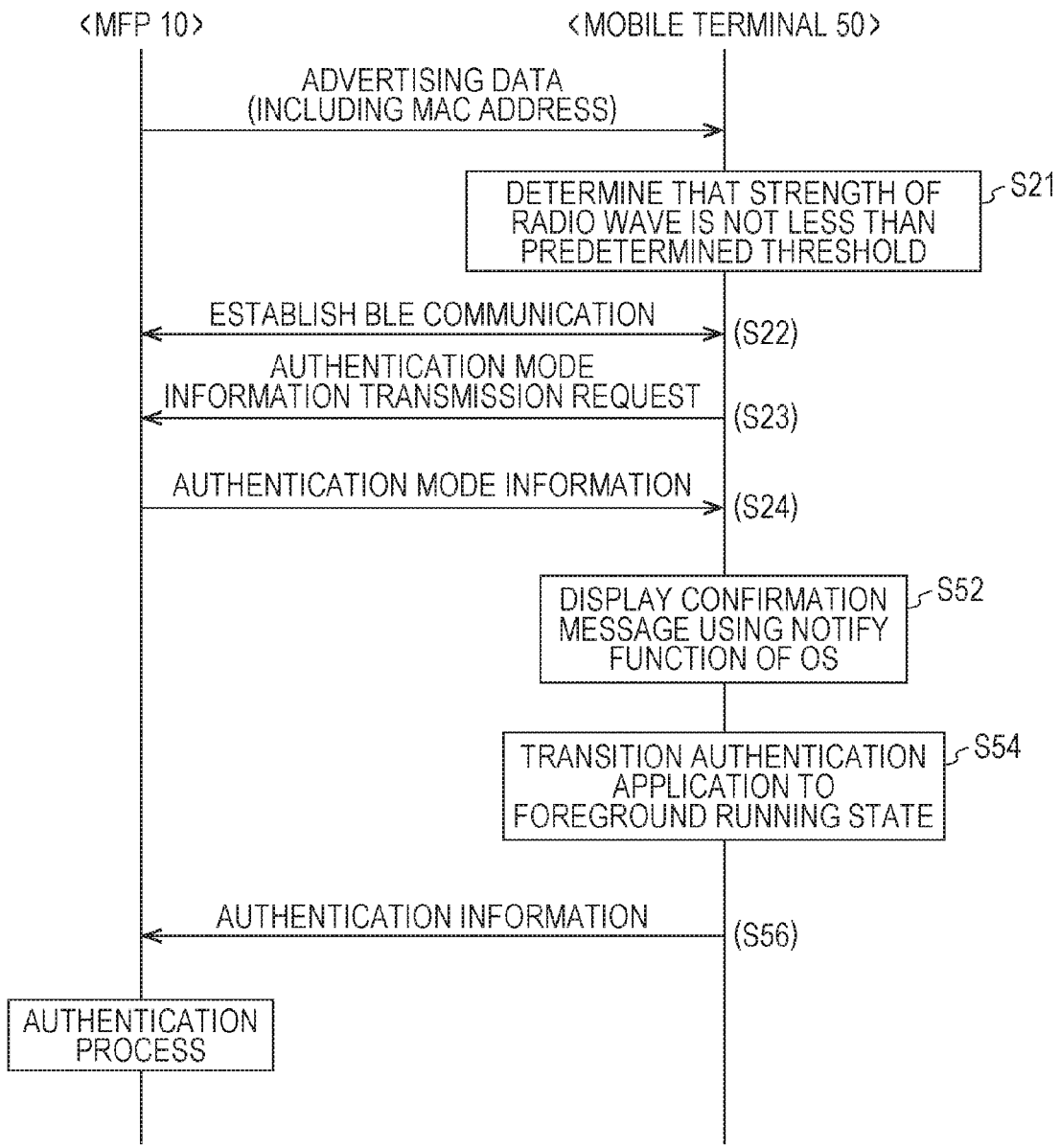
FIG. 9 is a timing chart illustrating exemplary operation in the communication system.

In the mobile terminal 50, the authentication program is running in the foreground running state (also referred to as active state) or the background running state (also referred to as non-active state). Various processes (processes subsequent to the approach determination process) including such a determination process (approach determination process) are performed by the authentication program. FIGS. 6 to 8 are flowcharts illustrating operation performed by the authentication program. In addition, FIG. 9 is a timing chart illustrating exemplary operation in the communication system 1.

In step S21 of FIG. 6, the above approach determination process is performed. Specifically, when the strength of the radio wave for near field communication (for BLE communication) from the MFP 10 is increased to be larger than the threshold TH1 for detection of the approach, the mobile terminal 50 determines that the mobile terminal 50 approaches the position within the predetermined range relative to the MFP 10 (see also FIG. 9). In other words, the mobile terminal 50 determines that the approach to the MFP 10 is detected. When the mobile terminal 50 determines that itself approaches the position within the predetermined range relative to the MFP 10, the mobile terminal 50 determines the MFP 10 as a cooperation device, and the process proceeds to step S22.

In step S22, the mobile terminal 50 extracts, from the advertising data, device identification information (information for identifying devices) included in a radio wave for near field communication (specifically, the advertising data) from the cooperation device (MFP 10). For example, the media access control address (MAC address) of the MFP 10 is extracted as the device identification information.

The advertising data has a freely usable area allocated for each BLE user company. Here, the MAC address of the MFP 10 is included in an area of the advertising data.

In addition, in step S22, the mobile terminal 50 establishes wireless communication (e.g., BLE wireless communication) with the MFP 10 based on the MAC address or the like (see also FIG. 9). Specifically, the mobile terminal 50 transmits a connection request to the cooperation device (MFP 10), and the wireless communication is established between the MFP 10 and the mobile terminal 50, with the BLE communication.

In the next steps S23 and S24, the mobile terminal 50 acquires information representing whether the authentication mode of the MFP 10 is the authentication request mode or the non-authentication request mode (hereinafter, also referred to as the authentication mode information), from the MFP 10 (see also FIG. 9).

Specifically, first, the mobile terminal 50 transmits the transmission request to the MFP 10 via BLE wireless communication for authentication mode information of the MFP 10, in response to the detection of the approach to the MFP 10 (step S23). In other words, when the approach to the MFP 10 is detected, the mobile terminal 50 sends an inquiry to the MFP 10 whether the authentication mode of the MFP 10 is the authentication request mode or the non-authentication request mode.

The MFP 10 transmits (sends back) the authentication mode information of the MFP 10 to the mobile terminal 50 via the BLE wireless communication, in response to the transmission request from the mobile terminal 50. For example, when the authentication mode of the MFP 10 is set to the authentication request mode (authentication mode requiring the authentication), the MFP 10 transmits the authentication mode information representing that (authentication mode of the MFP 10 set to the authentication request mode) to the mobile terminal 50. In contrast, when the authentication mode of the MFP 10 is set to the non-authentication request mode (authentication mode not requiring the authentication), the MFP 10 transmits the authentication mode information representing that (authentication mode of the MFP 10 set to the non-authentication request mode) to the mobile terminal 50. The mobile terminal 50 receives (acquires) the authentication mode information sent back in response to the transmission request via the BLE wireless communication from the MFP 10 (step S24).

Note that, herein, the authentication mode information is acquired via the BLE wireless communication, but the acquisition of the authentication mode information is not limited to this configuration, and, for example, the authentication mode information may be obtained via wireless LAN communication. Specifically, when the BLE wireless communication between the MFP 10 and the mobile terminal 50 is established, the MFP 10 transmits information of the MFP 10, such as IP address, to the mobile terminal 50, via the BLE communication. When communication between the MFP 10 and the mobile terminal 50 over the wireless LAN is established, based on the IP address or the like from the MFP 10, the mobile terminal 50 transmits the transmission request for authentication mode information to the MFP 10 via the wireless LAN communication. The authentication mode information of the MFP 10 is sent back from the MFP 10 to the mobile terminal 50 via the wireless LAN communication, and the authentication mode information may be obtained by the mobile terminal 50 via the wireless LAN communication.

In the next step S25, it is determined whether the authentication mode of the MFP 10 is the authentication request mode or the non-authentication request mode based on the authentication mode information from the MFP 10, and based on a result of the determination, it is determined whether the confirmation message is displayed.

For example, when the authentication mode of the MFP 10 is determined to be the non-authentication request mode (set to the non-authentication request mode), the process does not proceed to step S26 (e.g., display process of the confirmation message 500 (700) and the like) described later, and the flowchart of FIG. 6 is temporarily terminated. In other words, when the authentication mode information is acquired which represents that the authentication mode of the MFP 10 is the non-authentication request mode, the confirmation message 500 (700) or the like is determined not to be displayed. Note that, after a predetermined time period from the temporary termination of the flowchart of FIG. 6, the process of step S21 is started.

As described above, even if the approach of the mobile terminal 50 to the MFP 10 is detected, when the authentication mode of the MFP 10 is set to the non-authentication request mode, the confirmation message 500 (700) or the like is not displayed in the touch panel 75 of the mobile terminal 50.

In contrast, when the authentication mode of the MFP 10 is determined to be the authentication request mode (set to the authentication request mode), the process proceeds to step S26. In other words, on condition that the authentication mode information is acquired which represents that the authentication mode of the MFP 10 is the authentication request mode, the process proceeds from step S25 to step S26.

In step S26, it is determined whether the authentication program (authentication application) has the foreground running state or the background running state.

When the authentication program has the foreground running state, the process proceeds to step S31 of the flowchart of FIG. 7. In contrast, when the authentication program has the background running state, the process proceeds to step S51 of the flowchart of FIG. 8.

Note that, as described above, when the authentication program has the foreground running state, the confirmation message 500 (see FIGS. 12 and 13) is displayed, and when the authentication program has the background running state, the confirmation message 700 (see FIGS. 15 and 16) is displayed.

<4-3. In Case of Authentication Program Having Foreground Running State>

First, operations of the devices performed when the authentication program has the foreground running state in the mobile terminal 50 will be described with reference to FIG. 7.

In step S31, the mobile terminal 50 determines whether the user authentication information corresponding to the cooperation device (MFP 10) has been registered in the mobile terminal 50. Specifically, based on a registration data table (registered information) 400 stored in the mobile terminal 50 (see FIG. 11), the registration of the user authentication information is determined. When the authentication information (both of user ID and password) corresponding to the MAC address of the MFP 10 (cooperation device) is stored in the registration data table 400, the mobile terminal 50 determines that the user authentication information has been registered corresponding to the MFP 10. In contrast, when the authentication information corresponding to the MAC address of the MFP 10 is not completed (at least one of the user ID and the password is blank), the user authentication information corresponding to the MFP 10 is determined not to be registered.

<4-3-1. In Case of User Authentication Information Having been Registered>

When the user authentication information corresponding to the cooperation device (MFP 10) is determined to have been registered in the mobile terminal 50 (specifically, in the registration data table 400), the process proceeds from step S31 to step S32. For example, when the user authentication information (user ID "SUZUKI1" and password "******") corresponding to the MAC address ("11:22:33:44:55:66") of the MFP 10 is registered in the registration data table 400, the process proceeds to step S32.

Figure 12:
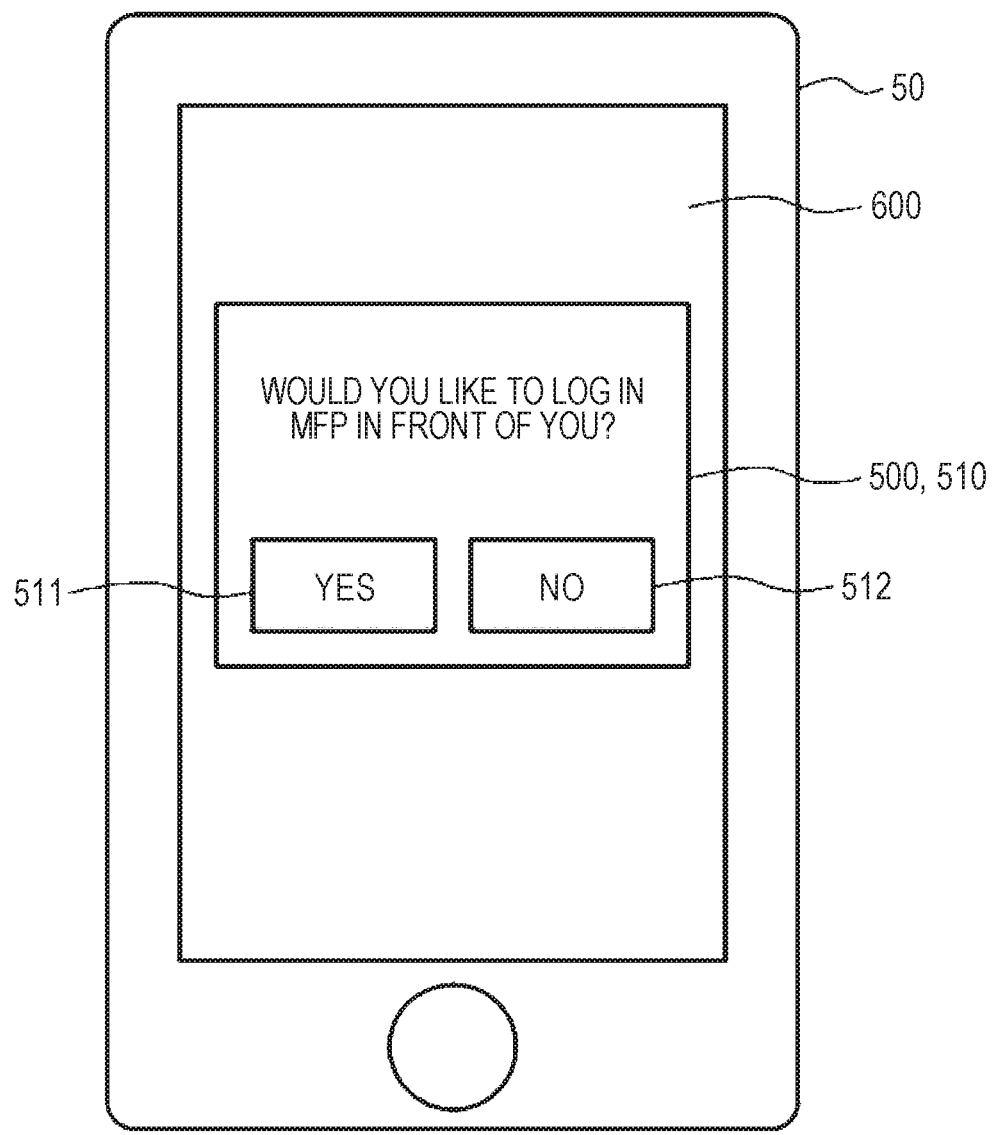
FIG. 12 is a diagram illustrating a confirmation message.

In this condition, in step S32, the mobile terminal 50 displays a confirmation message 510 (500) as illustrated in FIG. 12, in the touch panel 75. The confirmation message 510 is a message for inquiring of the user of the mobile terminal 50 whether to perform the authentication operation. In addition, the confirmation message 510 has text, for example, "Would you like to log in MFP in front of you?"

The confirmation message 510 is displayed in the touch panel 75 under the direct control of the authentication application. Specifically, the confirmation message 510 is displayed in the screen 600 of the authentication application having the foreground running state. More specifically, the confirmation message 510 is displayed in the dialogue screen superposed on the screen 600 of the authentication application.

The mobile terminal 50 waits for approval for the confirmation message 510. When a "YES" button 511 in the confirmation message 510 is pressed, and the approval for the confirmation message 510 is given by the user, the process proceeds from step S33 to step S35.

Note that, when a "NO" button 512 in the confirmation message 510 is pressed, and non-approval for the confirmation message 510 is given by user, the process does not proceed to step S35, and the flowcharts of FIGS. 6 and 7 are temporarily terminated. Then, after a predetermined time period, the process of step S21 (FIG. 6) is started again.

In step S35, the mobile terminal 50 performs the authentication operation, in response to the confirmation operation (operation of pressing the "YES" button 511) for the confirmation message 510 by the user. Specifically, the mobile terminal 50 extracts the user authentication information registered in the registration data table 400 (FIG. 11) (more specifically, the user authentication information for the MFP 10) from the registration data table 400, and transmits the extracted user authentication information to the MFP 10. In contrast, the MFP 10 performs the authentication process based on the user authentication information (process of comparing between the received user authentication information and the regular user authentication information).

When authentication is successfully achieved, the MFP 10 allows the user to use the MFP 10, and changes the display screen of the touch panel 25. Specifically, the display screen of the touch panel 25 is changed from a display screen 201 of FIG. 10 to a display screen 202 of FIG. 17. The display screen 201 is a display screen before login (login reception screen), and the display screen 202 is a display screen immediately after the login (top menu screen). The user can use the display screen 202 of the touch panel 25, the display screen displayed in the touch panel 75, or the like to advance the subsequent process.

Note that, upon authentication failure, the MFP 10 does not permit the user to use the MFP 10. In this configuration, the display screen of the touch panel 25 is not changed, and the display screen 201 of FIG. 10 is continued to be displayed in the touch panel 25 of the MFP 10.

<4-3-2. In Case of User Authentication Information Having not been Registered>

In contrast, in step S31, when the user authentication information corresponding to the cooperation device (MFP 10) is determined not to have been registered in the mobile terminal 50 (specifically, in the registration data table 400), the process proceeds to step S42. For example, when the user authentication information corresponding to the MAC address ("11:22:33:44:55:66") of the MFP 10 is not registered in the registration data table 400, the process proceeds from step S31 to step S42.

Figure 13:
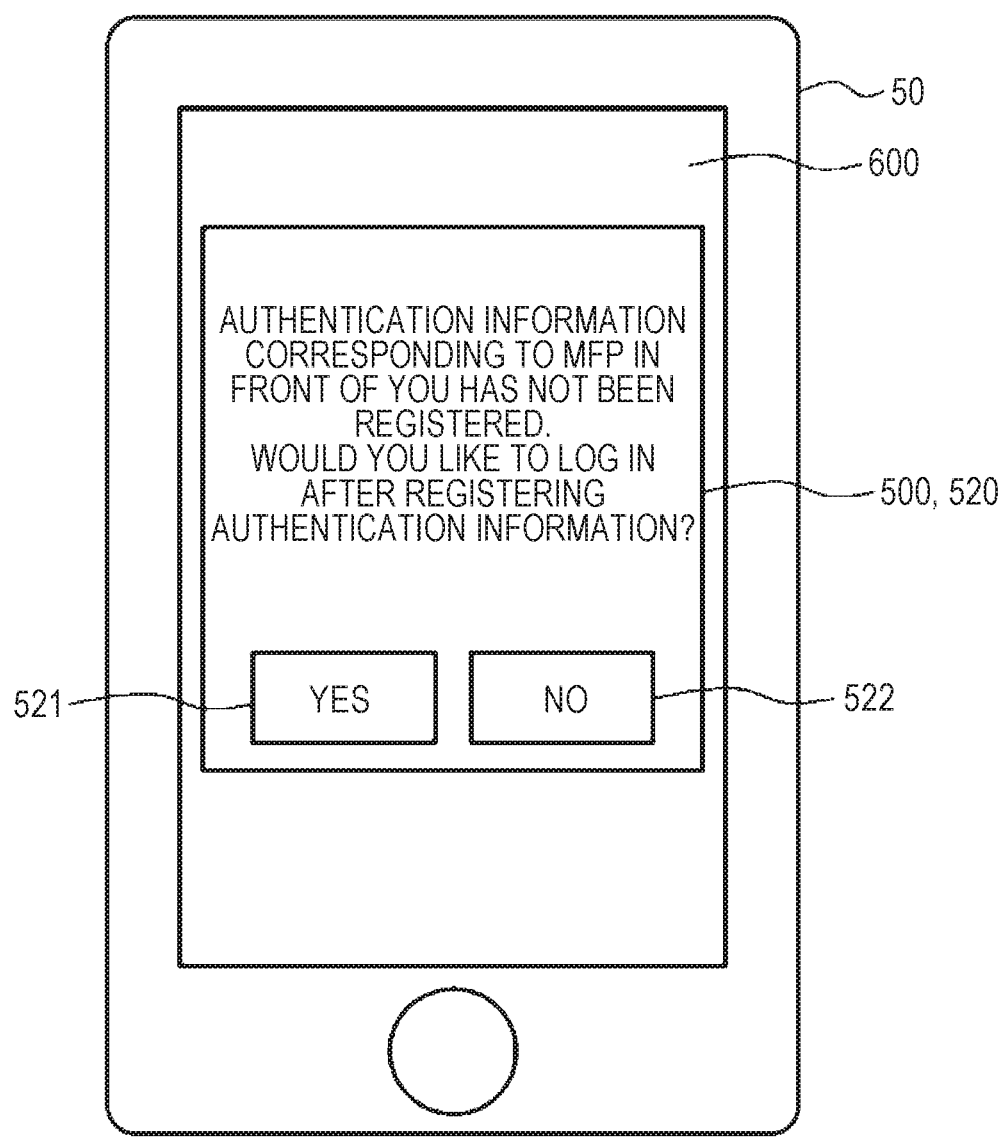
FIG. 13 is a diagram illustrating a confirmation message.

In this condition, in step S42, the mobile terminal 50 displays a confirmation message 520 (500) as illustrated in FIG. 13, in the touch panel 75. The confirmation message 520 is a message for confirming whether to perform the authentication operation (more specifically, authentication operation including authentication information input operation). In addition, the confirmation message 520 has text, for example, "Authentication information corresponding to MFP in front of you has not been registered. Would you like to log in after registering authentication information?"

The confirmation message 520 is displayed in the screen 600 of the authentication application having the foreground running state. More specifically, the confirmation message 520 is displayed in the dialogue screen superposed on the screen 600 of the authentication application.

The mobile terminal 50 waits for approval for the confirmation message 520. When a "YES" button 521 in the confirmation message 520 is pressed, and the approval for the confirmation message 520 is given by the user, the process proceeds from step S43 to step S44.

Note that, when a "NO" button 522 in the confirmation message 520 is pressed, and the confirmation message 520 is not approved ("non-approval"), the process does not proceed to step S44, and the flowcharts of FIGS. 6 and 7 are temporarily terminated. Then, after a predetermined time period, the process of step S21 (FIG. 6) is started again.

In step S44, the mobile terminal 50 displays the user authentication information input screen 580 (FIG. 14) in the touch panel 75, in response to the confirmation operation (approval operation) for the confirmation message 520 (500) by the user.

Figure 14:
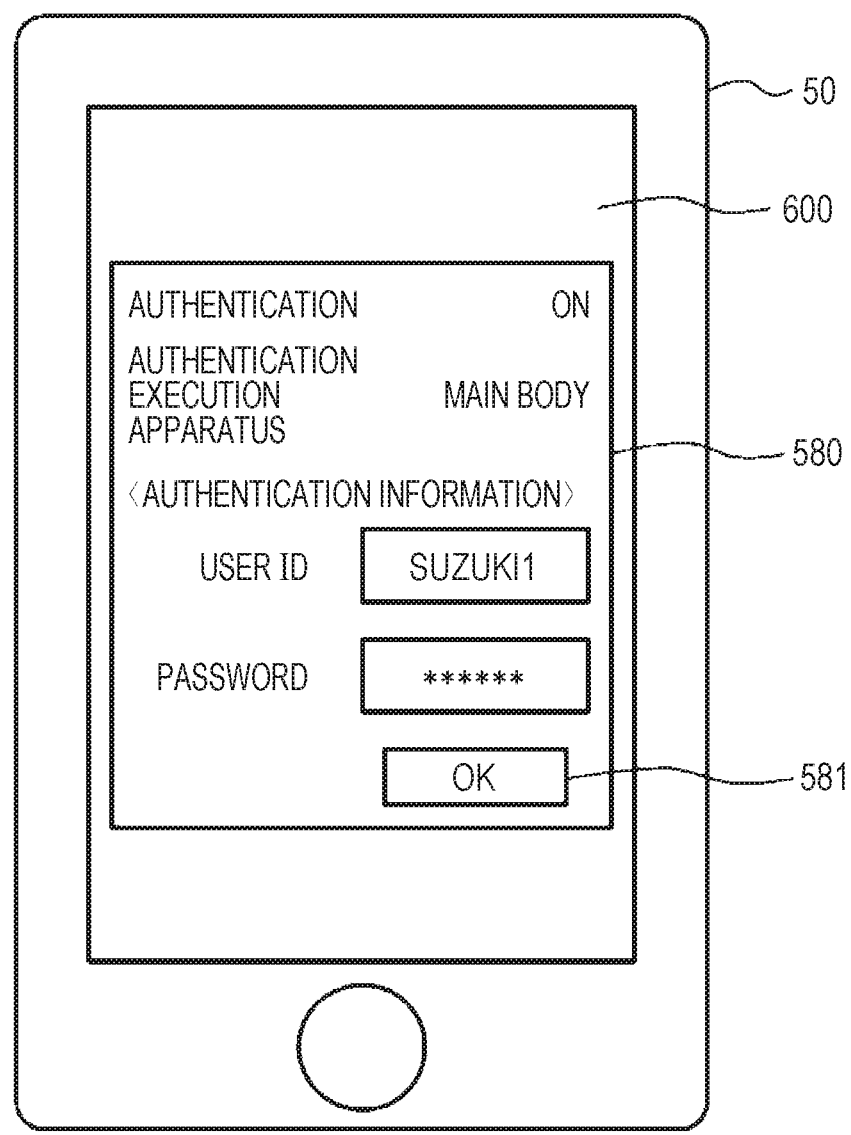
FIG. 14 is a diagram illustrating an authentication information input screen.

As illustrated in FIG. 14, the input screen 580 is a screen having entry fields for various authentication information (user ID, password, and the like). In addition, set contents of the authentication mode in the MFP 10 (herein, "authentication request mode" (authentication "ON" on the drawing)) are also displayed in the input screen 580, based on the authentication mode information from the MFP 10. Furthermore, an authentication execution device in the authentication process is also displayed in the input screen 580. Here, performance of the authentication process in the MFP 10 (the authentication execution device is the MFP 10 ("MAIN BODY")) is displayed in the input screen 580. The input screen 580 is displayed in the screen 600 of the authentication application having the foreground running state (more specifically, in the dialogue screen superposed on the screen 600). The input screen 580 is used to receive input of the user authentication information.

When the user ID, the password, and the like are input in the input screen 580, and then the OK button 581 is pressed to determine the input contents, the mobile terminal 50 registers the input user authentication information in the registration data table 400, and the process proceeds to step S45.

In step S45, the process similar to step S35 is performed. Specifically, the mobile terminal 50 transmits the input (registered) user authentication information to the MFP 10 (step S45). In contrast, the MFP 10 performs the authentication process or the like based on the user authentication information (process of comparing between the received user authentication information and the regular user authentication information).

As described above, when the authentication application has the foreground running state, upon detection of the approach of the mobile terminal 50 to the MFP 10, the confirmation message 500 (510, 520) (for foreground running state) is displayed in the screen 600 of the authentication application.

However, the confirmation message 500 is displayed in the mobile terminal 50, on condition that the authentication mode of the MFP 10 acquires the authentication mode information representing the "authentication request mode". In other words, even if the authentication application runs in the foreground, when the authentication mode of the MFP 10 is set to the "non-authentication request mode", the confirmation message 500 is not displayed in the mobile terminal 50. Thus, when unnecessity of the user authentication is set in the MFP 10, the confirmation message 500 for performance of the authentication operation is not displayed in the mobile terminal 50, and the opportunities of displaying the unnecessary message for the user can be reduced.

Description has been made above of, for example, display of the confirmation message 500 upon running of the authentication application in the foreground.

In contrast, when the authentication application runs in the background, the authentication application cannot directly display the confirmation message 500 in the screen of the authentication application, under the direct control of the authentication application. In other words, the authentication application running in the background cannot display the screen of the authentication application to be superposed on a screen of another application running in the foreground (or home screen).

Therefore, in the present embodiment, when the authentication application runs in the background, the notify function of the operating system (OS) of the mobile terminal 50 is used to display the confirmation message 700 (710, 720) in the touch panel 75 of the mobile terminal 50.

<4-4. In Case of Authentication Program Having Background Running State>

Next, operations of the devices performed when the authentication program has the background running state in the mobile terminal 50 will be described with reference to FIG. 8.

In step S51, the mobile terminal 50 determines whether the user authentication information corresponding to the cooperation device (MFP 10) has been registered in the mobile terminal 50. Specifically, based on a registration data table (registered information) 400 stored in the mobile terminal 50 (see FIG. 11), the registration of the user authentication information is determined. In step S51, the determination process similar to step S31 is performed.

<4-4-1. In Case of User Authentication Information Having been Registered>

When the user authentication information corresponding to the cooperation device (MFP 10) is determined to have been registered in the mobile terminal 50 (specifically, in the registration data table 400), the process proceeds from step S51 to step S52. For example, when the user authentication information (user ID "SUZUKI1" and password "******") corresponding to the MAC address ("11:22:33:44:55:66") of the MFP 10 is registered in the registration data table 400, the process proceeds to step S52.

Figure 15:
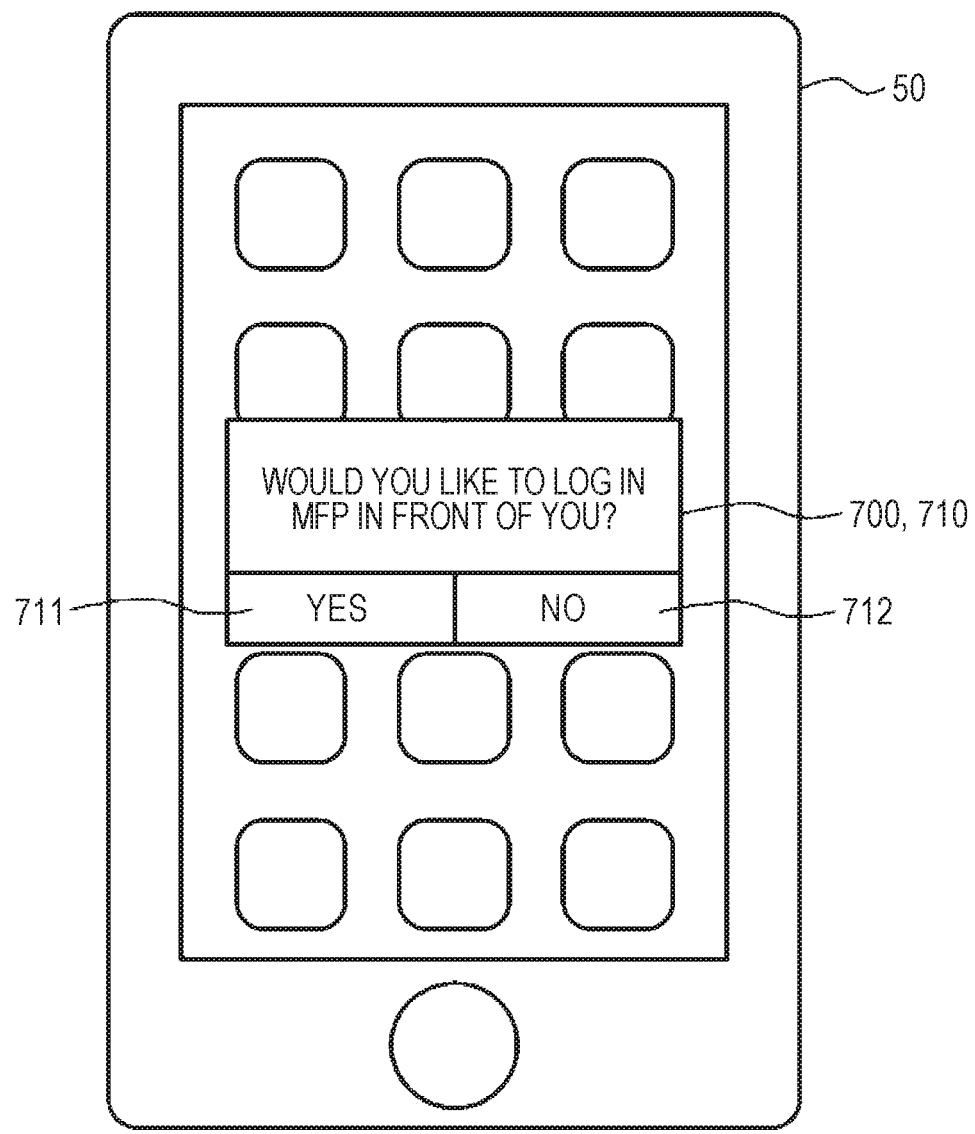
FIG. 15 is a diagram illustrating a confirmation message.

In this condition, in step S52, the mobile terminal 50 displays a confirmation message 710 (700) as illustrated in FIG. 15, in the touch panel 75 (see also FIG. 9). The confirmation message 710 is a message for inquiring of the user of the mobile terminal 50 whether to perform the authentication operation. The confirmation message 710 has text, for example, "Would you like to log in MFP in front of you?"

The confirmation message 710 is displayed in the touch panel 75, using the notify function of the operating system (OS) of the mobile terminal 50 (see FIG. 15). The notify function of the OS of the mobile terminal 50 is one of functions provided by the OS, and is a function of notifying the user of the message about each application (application having the non-active state) through the OS. When the notify function of the OS is used, the user can be notified of a message about an application running in the background.

Specifically, the authentication application running in the background transmits and receives, to and from the OS, text information representing the confirmation message 710 (character string information) and contents of operation performed upon reception of operation to the confirmation message 710 (execution command etc. described in URL scheme). In step S52, as contents of operation upon pressing the "YES" button (upon approval), transition of the authentication application to the foreground running state is specified, and as operation in the authentication application, performance of the authentication operation (more specifically, authentication information transmission operation) is specified. For example, a URL scheme "application1://auth?" is specified. Note that the URL scheme is specified in the format of "(application name)://(command name)", or the like.

The OS displays the confirmation message 710 in the touch panel 75, based on the received text information. For example, the confirmation message 710 is displayed in the dialogue screen superposed on a screen displayed in the screen displayed in the touch panel 75 at that time (e.g., home screen or screen of another application). According to this configuration, even if the authentication program does not have the active state, the mobile terminal 50 can notify the user of the message for confirming performance of the authentication operation.

The mobile terminal 50 waits for approval for the confirmation message 710. When a "YES" button 711 in the confirmation message 710 is pressed, and the approval for the confirmation message 710 is given by the user, the process proceeds from step S53 to step S54.

Note that, when a "NO" button 712 in the confirmation message 710 is pressed, and non-approval for the confirmation message 710 is given by user, the process does not proceed to step S54, and the flowcharts of FIGS. 6 to 8 are temporarily terminated. Then, after a predetermined time period, the process of step S21 (FIG. 6) is started again.

In step S54, the authentication application transitions (switches) from the background running state to the foreground running state, and in the next step S56, the mobile terminal 50 performs authentication operation (see also FIG. 9).

Specifically, operation is performed based on the URL scheme specified as a command to be executed upon pressing the "YES" button 711. For example, based on the URL scheme "application1://auth?", the authentication application transitions to the foreground running state, and the authentication operation (more specifically, authentication information transmission operation) is performed, as operation in the authentication application. More specifically, the operation similar to step S35 is performed.

Specifically, the mobile terminal 50 extracts the user authentication information registered in the registration data table 400 (FIG. 11) (more specifically, the user authentication information for the MFP 10) from the registration data table 400, and transmits the extracted user authentication information to the MFP 10. In contrast, the MFP 10 performs the authentication process based on the user authentication information (process of comparing between the received user authentication information and the regular user authentication information) (see also FIG. 9).

When authentication is successfully achieved, the MFP 10 allows the user to use the MFP 10, and changes the display screen of the touch panel 25. Specifically, the display screen of the touch panel 25 is changed from the display screen (login reception screen) 201 of FIG. 10 to the display screen (top menu screen) 202 of FIG. 17. The user can use the display screen 202 of the touch panel 25, the display screen displayed in the touch panel 75, or the like to advance the subsequent process.

Note that, upon authentication failure, the MFP 10 does not permit the user to use the MFP 10. In this configuration, the display screen of the touch panel 25 is not changed, and the display screen 201 of FIG. 10 is continued to be displayed in the touch panel 25.

<4-4-2. In Case of User Authentication Information Having not been Registered>

In contrast, in step S51, when the user authentication information corresponding to the cooperation device (MFP 10) is determined not to have been registered in the mobile terminal 50 (specifically, in the registration data table 400), the process proceeds to step S62. For example, when the user authentication information corresponding to the MAC address ("11:22:33:44:55:66") of the MFP 10 is not registered in the registration data table 400, the process proceeds from step S51 to step S62.

Figure 16:
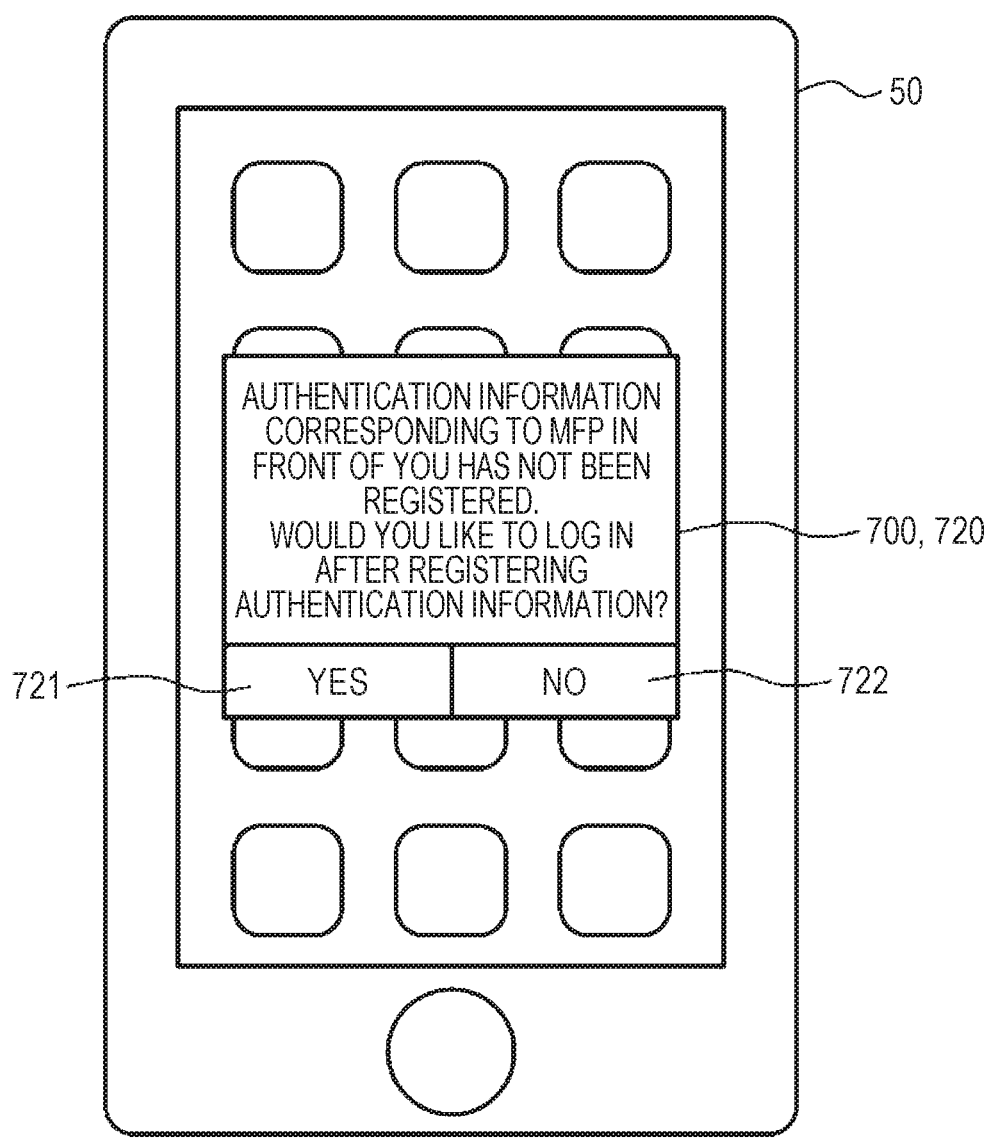
FIG. 16 is a diagram illustrating a confirmation message.

In this condition, in step S62, the mobile terminal 50 displays a confirmation message 720 (700) as illustrated in FIG. 16, in the touch panel 75. The confirmation message 720 is a message for confirming whether to perform the authentication operation (more specifically, authentication operation including authentication information input operation). In addition, the confirmation message 720 has text, for example, "Authentication information corresponding to MFP in front of you has not been registered. Would you like to log in after registering authentication information?"

The confirmation message 720 is displayed in the touch panel 75, using the notify function of the operating system (OS) of the mobile terminal 50 (see FIG. 16).

Specifically, the authentication application running in the background transmits and receives, to and from the OS, text information representing the confirmation message 720 (character string information) and contents of operation performed upon reception of operation to the confirmation message 720 (execution command etc. described in URL scheme). In step S62, as contents of operation upon pressing the "YES" button (upon approval), transition of the authentication application to the foreground running state is specified, and as operation in the authentication application, performance of the authentication operation (more specifically, authentication information registration operation (input operation)) is specified. For example, a URL scheme "application1://register?" is specified.

The OS displays the confirmation message 720 in the touch panel 75, based on the received text information. For example, the confirmation message 720 is displayed in the dialogue screen superposed on a screen displayed in the screen displayed in the touch panel 75 at that time (e.g., home screen or screen of another application).

The mobile terminal 50 waits for approval for the confirmation message 720. When a "YES" button 721 in the confirmation message 720 is pressed, and the approval for the confirmation message 720 is given by the user, the process proceeds from step S63 to step S64.

Note that, when a "NO" button 722 in the confirmation message 720 is pressed, and non-approval for the confirmation message 720 is given by user, the process does not proceed to step S64, and the flowcharts of FIGS. 6 to 8 are temporarily terminated. Then, after a predetermined time period, the process of step S21 (FIG. 6) is started again.

In step S64, the authentication application transitions (switches) from the background running state to the foreground running state, and in the next step S65, the mobile terminal 50 performs authentication information registration operation.

Specifically, operation is performed based on the URL scheme specified as a command to be executed upon pressing the "YES" button 721. For example, based on the URL scheme "application1://register?", the authentication application transitions to the foreground running state, and the authentication information registration operation (input operation) is performed, as operation in the authentication application.

More specifically, in step S65, the mobile terminal 50 displays the user authentication information input screen 580 (FIG. 14) in the touch panel 75, in response to pressing the "YES" button 721.

When the OK button 581 is pressed after the user authentication information is input using the input screen 580, the process proceeds to step S66. In step S66, the operation similar to step S45 is performed. Specifically, the mobile terminal 50 transmits the input user authentication information to the MFP 10. In contrast, the MFP 10 performs the authentication process or the like based on the user authentication information (process of comparing between the received user authentication information and the regular user authentication information).

As described above, when the authentication application has the background running state upon detection of the approach of the mobile terminal 50 to the MFP 10, the confirmation message 700 (710, 720) (for the background running state) is displayed in the touch panel 75 using the notify function of the OS.

However, the confirmation message 700 is displayed in the mobile terminal 50, on condition that the authentication mode of the MFP 10 acquires the authentication mode information representing the "authentication request mode". In other words, even if the authentication application is operated in the background, when the authentication mode of the MFP 10 is set to the "non-authentication request mode", the confirmation message 700 is not displayed in the mobile terminal 50. Thus, when unnecessity of the user authentication is set in the MFP 10, the confirmation message 700 for performance of the authentication operation is not displayed in the mobile terminal 50, and the opportunities of displaying the unnecessary message for the user can be reduced.

In addition, the transmission request for authentication mode information is transmitted from the mobile terminal 50 to the MFP 10, in response to the detection of the approach to the MFP 10, and the authentication mode information is acquired which is sent back from the MFP 10, in response to the transmission request. Thus, the mobile terminal 50 can acquire latest authentication mode information upon detection of the approach to the MFP 10.

<5. Modifications and Like>

An embodiment of the present invention has been described, but the present invention is not limited to the above description.

For example, in the above embodiment, an exemplary mode has been described in which the authentication mode information is transmitted from the MFP 10 to the mobile terminal 50, in response to the transmission request for authentication mode information to acquire the authentication mode information. However, the present invention is not limited to this mode, and the authentication mode information may be acquired based on the advertising data broadcast-transmitted from the MFP 10 via BLE.

Specifically, in the MFP 10, the advertising data is broadcast-transmitted, the advertising data including the authentication mode information of the MFP 10 in the area allocated for each BLE user company. The mobile terminal 50 may receive the advertising data broadcast-transmitted from the MFP 10, and acquire (extract) the authentication mode information from the advertising data, when detecting approach to the MFP 10.

In addition, in the above embodiment or the like, an exemplary mode has been described in which the authentication process (authentication information comparison process) is performed in the MFP 10, but the authentication process is not limited to this mode. For example, the authentication process may be performed in an external server (e.g., authentication server) different from the MFP 10.

Specifically, when receiving the user authentication information from the mobile terminal 50 (step S35 of FIG. 7 or the like), the MFP 10 transmits (transfers) the user authentication information to the authentication server (without performing the authentication process in the MFP 10). Alternatively, the mobile terminal 50 transmits the user authentication information (directly) to the authentication server. In the authentication server, the authentication process (process of comparing between the user authentication information received from the MFP 10 or the mobile terminal 50, and the regular user authentication information) is performed based on the user authentication information from the mobile terminal 50. Then, an authentication result is transmitted from the authentication server to the MFP 10, and the MFP 10 determines whether the user can use the MFP 10 based on success or failure in authentication.

As described above, the authentication process may be performed in the external server different from the MFP 10.

In addition, in the above embodiment or the like, an exemplary mode has been described in which approach of the mobile terminal 50 to the MFP 10 is determined mainly using, for example, the strength of the radio wave of BLE communication, but determination of the approach is not limited to this mode, and the approach of the mobile terminal 50 to the MFP 10 may be determined using, for example, a strength of a radio wave of other near field communication.

Although the present invention has been described and illustrated in detail, it is clearly understood that the same is by way of illustrated and example only and is not to be taken by way of limitation, the scope of the present invention being interpreted by terms of the appended claims.

What is claimed is:

1. A mobile terminal operated in cooperation with an information processing device capable of setting an authentication mode relating to user authentication to one mode selected from two kinds of modes of an authentication request mode requiring the user authentication, and a non-authentication request mode not requiring the user authentication, the mobile terminal comprising:
- a display configured to display a confirmation message inquiring a user of the mobile terminal whether to perform authentication operation, upon detection of approach of the mobile terminal to the information processing device; and
- a controller configured to control display operation for displaying the confirmation message,
- the controller acquiring, from the information processing device, authentication mode information being information representing whether the authentication mode of the information processing device is the authentication request mode or the non-authentication request mode, and the controller displaying the confirmation message on the display, on condition that the authentication mode information is acquired, the authentication mode information representing that the authentication mode is the authentication request mode.

2. The mobile terminal according to claim 1, wherein on condition that a strength of a radio wave for near field communication from the information processing device is larger than a predetermined threshold, the controller determines that the approach of the mobile terminal to the information processing device is detected.

3. The mobile terminal according to claim 1, wherein, while an application software program for performing the authentication operation runs in a foreground in the mobile terminal:
- when acquiring the authentication mode information representing that the authentication mode is the authentication request mode, the controller displays the confirmation message in a screen of the application software program, and
- when acquiring the authentication mode information representing that the authentication mode is the non-authentication request mode, the controller does not display the confirmation message on the display.

4. The mobile terminal according to claim 1, wherein, while an application software program for performing the authentication operation runs in a background in the mobile terminal:
- when acquiring the authentication mode information representing that the authentication mode is the authentication request mode, the controller displays the confirmation message on the display, using a notify function of an operating system of the mobile terminal, and
- when acquiring the authentication mode information representing that the authentication mode is the non-authentication request mode, the controller does not display the confirmation message on the display.

5. The mobile terminal according to claim 1, wherein the controller transmits a transmission request for the authentication mode information to the information processing device, in response to detection of approach of the mobile terminal to the information processing device, and the controller acquires the authentication mode information transmitted from the information processing device, in response to the transmission request.

6. The mobile terminal according to claim 1, wherein the controller acquires the authentication mode information, based on transmission data broadcast-transmitted from the information processing device in near field communication, upon detection of approach of the mobile terminal to the information processing device.

7. The mobile terminal according to claim 1, wherein the controller acquires the authentication mode information from the information processing device via near field communication.

8. The mobile terminal according to claim 1, wherein the controller acquires the authentication mode information from the information processing device via wireless LAN communication.

9. A non-transitory computer-readable recording medium storing a computer readable program causing a computer built in a mobile terminal operated in cooperation with an information processing device capable of setting an authentication mode relating to user authentication to one mode selected from two kinds of modes of an authentication request mode requiring the user authentication, and a non-authentication request mode not requiring the user authentication, the program causing the computer to perform functions comprising:
- acquiring, from the information processing device, authentication mode information being information representing whether the authentication mode of the information processing device is the authentication request mode or the non-authentication request mode; and
- displaying, on a display of the mobile terminal, a confirmation message inquiring a user of the mobile terminal whether to perform authentication operation, upon detection of approach of the mobile terminal to the information processing device,
- wherein the confirmation message is displayed on condition that the acquired authentication mode information represents that the authentication mode is the authentication request mode.

10. The non-transitory computer-readable recording medium storing the computer readable program according to claim 9, wherein, in the displaying step, on condition that a strength of a radio wave for near field communication from the information processing device is larger than a predetermined threshold, detection of approach of the mobile terminal to the information processing device is determined.

11. The non-transitory computer-readable recording medium storing the computer readable program according to claim 9, wherein the program is an application software program performing the authentication operation, and
- wherein, in the displaying step, while the application software program runs in a foreground in the mobile terminal:
  - when the authentication mode information representing that the authentication mode is the authentication request mode is acquired, the confirmation message is displayed in a screen of the application software program, and
  - when the authentication mode information representing that the authentication mode is the non-authentication request mode is acquired, the confirmation message is not displayed on the display.

12. The non-transitory computer-readable recording medium storing the computer readable program according to claim 9, wherein the program is an application software program performing the authentication operation, and
- in the displaying step, while the application software program runs in a background in the mobile terminal:
  - when the authentication mode information representing that the authentication mode is the authentication request mode is acquired, the confirmation message is displayed on the display, using a notify function of an operating system of the mobile terminal, and when the authentication mode information representing that the authentication mode is the non-authentication request mode is acquired, the confirmation message is not displayed on the display.

13. The non-transitory computer-readable recording medium storing the computer readable program according to claim 9, further causing the computer to perform a function comprising transmitting a transmission request for the authentication mode information to the information processing device, in response to detection of approach of the mobile terminal to the information processing device, before the acquiring of the authentication mode information, wherein the authentication mode information transmitted from the information processing device is acquired in response to the transmission request.

14. The non-transitory computer-readable recording medium storing the computer readable program according to claim 9, wherein the authentication mode information is acquired based on transmission data broadcast-transmitted from the information processing device in near field communication, upon detection of approach of the mobile terminal to the information processing device.

15. The non-transitory computer-readable recording medium storing the computer readable program according to claim 9, wherein the authentication mode information is acquired from the information processing device via near field communication.

16. The non-transitory computer-readable recording medium storing the computer readable program according to claim 9, wherein the authentication mode information is acquired from the information processing device via wireless LAN communication.

17. A communication system comprising:
an information processing device configured to set an authentication mode relating to user authentication to one mode selected from two kinds of modes of an authentication request mode requiring the user authentication, and a non-authentication request mode not requiring the user authentication; and
a mobile terminal operated in cooperation with the information processing device,
wherein the mobile terminal comprises:
a display configured to display a confirmation message inquiring a user of the mobile terminal whether to perform authentication operation, upon detection of approach of the mobile terminal to the information processing device; and
a controller configured to control display operation for displaying the confirmation message,
wherein the information processing device comprises a transmitter configured to transmit, to the mobile terminal, authentication mode information being information representing whether the authentication mode of the information processing device is the authentication request mode or the non-authentication request mode, and
wherein the controller of the mobile terminal acquires the authentication mode information from the information processing device, and displays the confirmation message on the display of the mobile terminal, on condition that the acquired authentication mode information represents that the authentication mode is the authentication request mode.

\* \* \* \* \*